(12) United States Patent
Sakamoto

(10) Patent No.: US 9,448,923 B2
(45) Date of Patent: Sep. 20, 2016

(54) INFORMATION PROCESSING DEVICE FOR SYNCHRONIZING UPDATE INFORMATION BETWEEN A SOLID STATE DRIVE AND A BACKUP STORAGE

(71) Applicant: NEC Corporation, Minato-ku, Tokyo (JP)

(72) Inventor: Yuu Sakamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 147 days.

(21) Appl. No.: 14/100,181

(22) Filed: Dec. 9, 2013

(65) Prior Publication Data

US 2014/0173188 A1 Jun. 19, 2014

(30) Foreign Application Priority Data

Dec. 17, 2012 (JP) ................................. 2012-274359

(51) Int. Cl.
  *G06F 3/00* (2006.01)
  *G06F 13/00* (2006.01)
  *G06F 5/00* (2006.01)
  *G06F 12/00* (2006.01)
  *G06F 12/02* (2006.01)
  *G06F 11/14* (2006.01)

(52) U.S. Cl.
  CPC ....... *G06F 12/0246* (2013.01); *G06F 11/1456* (2013.01); *G06F 11/1458* (2013.01); *G06F 11/1469* (2013.01); *G06F 2212/7205* (2013.01)

(58) Field of Classification Search
  CPC .......... G06F 12/0246; G06F 11/1456; G06F 11/1458; G06F 11/1469

USPC ........ 710/1, 3, 20, 31, 33, 52; 711/103, 111, 711/162

See application file for complete search history.

(56) References Cited

U.S. PATENT DOCUMENTS

| | | | |
|---|---|---|---|
| 2003/0033471 A1* | 2/2003 | Lin et al. ....................... | 711/103 |
| 2008/0162846 A1* | 7/2008 | Kodama ........................ | 711/162 |
| 2009/0089485 A1* | 4/2009 | Yeh ...................... | G06F 12/0246 711/103 |
| 2011/0131368 A1* | 6/2011 | Lee et al. ....................... | 711/103 |
| 2011/0202735 A1* | 8/2011 | Kono et al. ................... | 711/162 |
| 2011/0246736 A1* | 10/2011 | Ueda ............................. | 711/162 |
| 2012/0324288 A1* | 12/2012 | Hsu ...................... | G06F 11/1076 714/32 |

FOREIGN PATENT DOCUMENTS

| | | |
|---|---|---|
| JP | 2005-316793 A | 11/2005 |
| JP | 2007-233961 A | 9/2007 |

* cited by examiner

*Primary Examiner* — Farley Abad
*Assistant Examiner* — Henry Yu

(57) ABSTRACT

An information processing device includes: an SSD storage controlling unit for storing a physical address of a storage region of data stored in an SSD (Solid State Drive) and a number of updates of the storage region, as SSD update information into the SSD; a backup storage controlling unit for storing copy data of the data stored in the SSD, and copy update information obtained by copying the SSD update information, in association with each other into a backup storage part; an acquiring unit for acquiring the copy update information corresponding to data associated with the SSD update information acquired from the SSD, from the backup storage part; and a deciding unit for deciding the data to be stored into the backup storage part based on the acquired SSD update information and the acquired copy update information.

7 Claims, 24 Drawing Sheets

Fig.5

SSD (12)

Table 41B:

| LOGICAL ADDRESS A | PHYSICAL ADDRESS Z |
|---|---|
| LOGICAL ADDRESS B | PHYSICAL ADDRESS B |
| LOGICAL ADDRESS C | PHYSICAL ADDRESS Y |
| LOGICAL ADDRESS D | PHYSICAL ADDRESS D |
| LOGICAL ADDRESS E | PHYSICAL ADDRESS X |

BACKUP STORAGE PART (13)

Table 51A:

| | | | |
|---|---|---|---|
| LOGICAL ADDRESS A | PHYSICAL ADDRESS A | ERASE COUNT A | DATA A |
| LOGICAL ADDRESS B | PHYSICAL ADDRESS B | ERASE COUNT B | DATA B |
| LOGICAL ADDRESS C | PHYSICAL ADDRESS C | ERASE COUNT C | DATA C |
| LOGICAL ADDRESS D | PHYSICAL ADDRESS D | ERASE COUNT D | DATA D |
| LOGICAL ADDRESS E | PHYSICAL ADDRESS E | ERASE COUNT E | DATA E |

BACKUP STORAGE PART (13)

51B

| | | | |
|---|---|---|---|
| LOGICAL ADDRESS A | PHYSICAL ADDRESS Z | ERASE COUNT Z | DATA A+ |
| LOGICAL ADDRESS B | PHYSICAL ADDRESS B | ERASE COUNT B | DATA B |
| LOGICAL ADDRESS C | PHYSICAL ADDRESS Y | ERASE COUNT Y | DATA C+ |
| LOGICAL ADDRESS D | PHYSICAL ADDRESS D | ERASE COUNT D | DATA D |
| LOGICAL ADDRESS E | PHYSICAL ADDRESS X | ERASE COUNT X | DATA E+ |

SSD (12)

41C

| | |
|---|---|
| LOGICAL ADDRESS A | PHYSICAL ADDRESS AA |
| LOGICAL ADDRESS B | PHYSICAL ADDRESS B |
| LOGICAL ADDRESS C | PHYSICAL ADDRESS AB |
| LOGICAL ADDRESS D | PHYSICAL ADDRESS D |
| LOGICAL ADDRESS E | PHYSICAL ADDRESS AC |

| | 12 SSD | 42C |
|---|---|---|
| PHYSICAL ADDRESS A | DATA A | ERASE COUNT A |
| PHYSICAL ADDRESS B | DATA B | ERASE COUNT B |
| PHYSICAL ADDRESS C | DATA C | ERASE COUNT C |
| PHYSICAL ADDRESS D | DATA D | ERASE COUNT D |
| PHYSICAL ADDRESS E | DATA E | ERASE COUNT E |
| ⋮ | ⋮ | ⋮ |
| PHYSICAL ADDRESS X | DATA E+ | ERASE COUNT X |
| PHYSICAL ADDRESS Y | DATA C+ | ERASE COUNT Y |
| PHYSICAL ADDRESS Z | DATA A+ | ERASE COUNT Z |
| ⋮ | ⋮ | ⋮ |
| PHYSICAL ADDRESS AA | DATA A | ERASE COUNT AA |
| PHYSICAL ADDRESS AB | DATA C | ERASE COUNT AB |
| PHYSICAL ADDRESS AC | DATA E | ERASE COUNT AC |
| | ⋮ | |

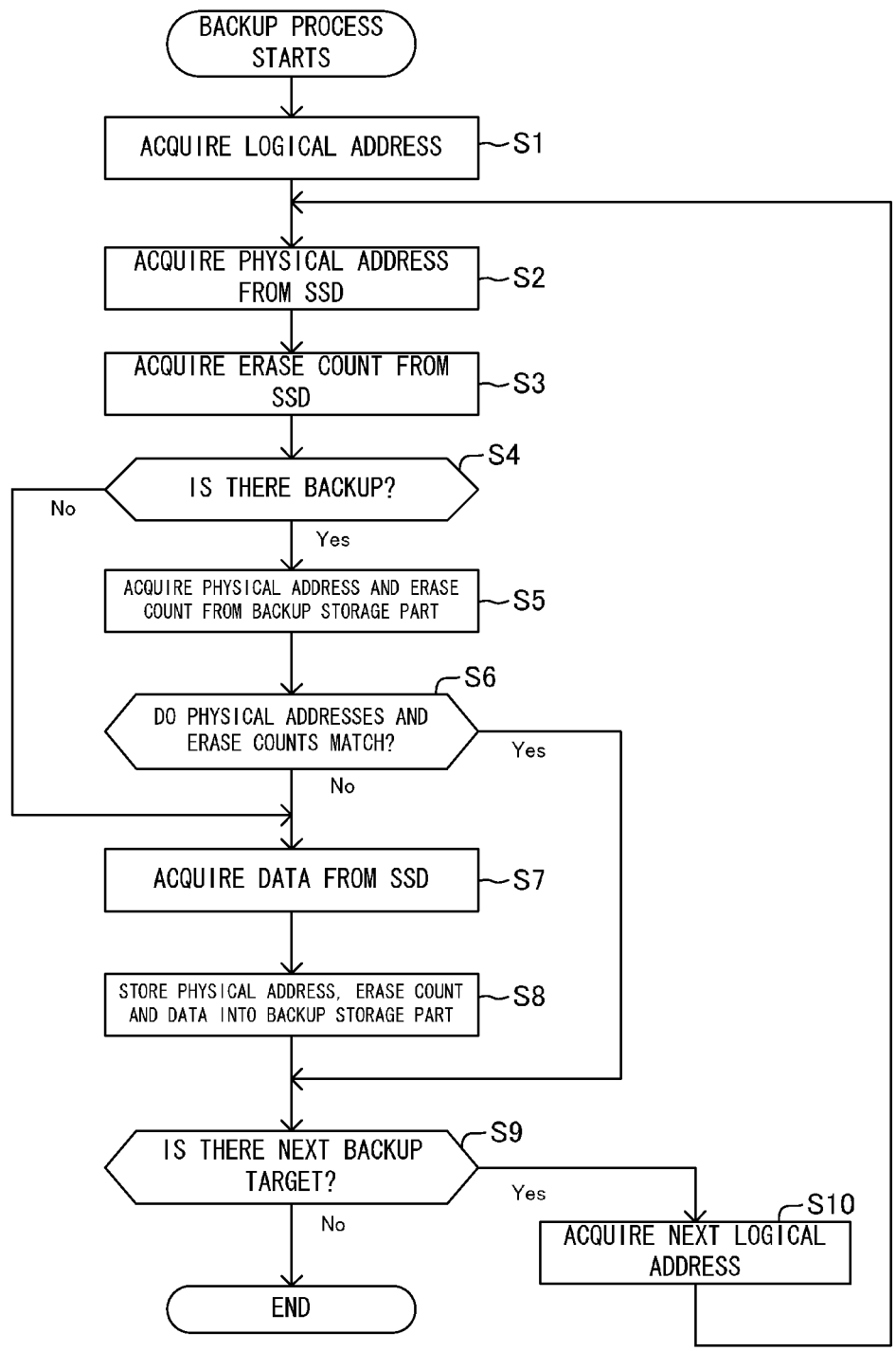

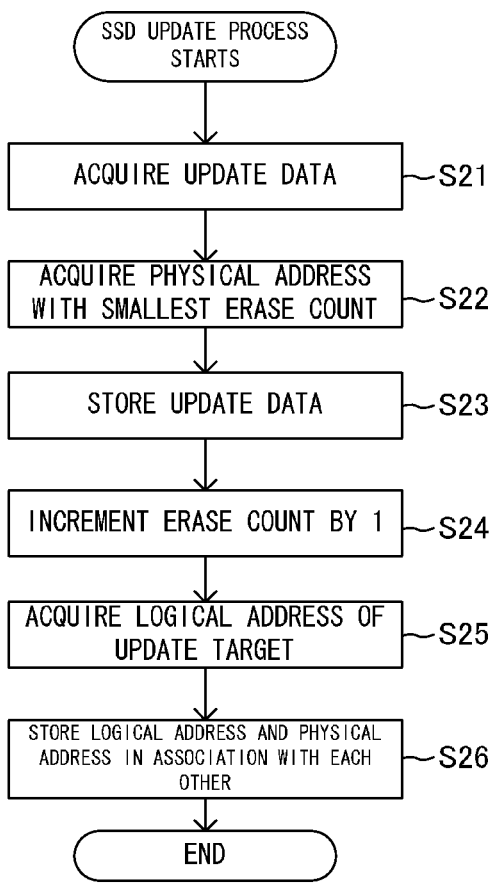

| SSD | |
|---|---|
| LOGICAL ADDRESS | PHYSICAL ADDRESS |
| 0x000 | 0x101 |
| 0x001 | 0x102 |
| 0x002 | 0x103 |
| ... | |

141a

122b

| SSD | |
|---|---|
| LOGICAL ADDRESS | PHYSICAL ADDRESS |
| 0x000 | 0x101 |
| 0x001 | 0x102 |
| 0x002 | 0x103 |
| ... | |

141b

...

141n

122n

| SSD | |
|---|---|
| LOGICAL ADDRESS | PHYSICAL ADDRESS |
| 0x000 | 0x101 |
| 0x001 | 0x102 |
| 0x002 | 0x103 |
| ... | |

| SSD | | |
|---|---|---|
| PHYSICAL ADDRESS | DATA | ERASE COUNT |
| 0x101 | AAA | 1 |
| 0x102 | BBB | 1 |
| 0x103 | CCC | 1 |
| ... | | |

142a

122b

| SSD | | |
|---|---|---|
| PHYSICAL ADDRESS | DATA | ERASE COUNT |
| 0x101 | ABC | 2 |
| 0x102 | BCD | 2 |
| 0x103 | CDE | 2 |
| ... | | |

142b

...

122n

| SSD | | |
|---|---|---|
| PHYSICAL ADDRESS | DATA | ERASE COUNT |
| 0x101 | ZZZ | 10 |
| 0x102 | YYY | 9 |
| 0x103 | XXX | 11 |
| ... | | |

| PHYSICAL ADDRESS | SSD DATA | ERASE COUNT |
|---|---|---|
| 0x101 | AAA | 1 |
| 0x102 | BBB | 1 |
| 0x103 | CCC | 1 |
| ... | ... | ... |
| 0x201 | AAA+ | 2 |
| 0x202 | CCC+ | 2 |

142a'

122b

| PHYSICAL ADDRESS | SSD DATA | ERASE COUNT |
|---|---|---|
| 0x101 | ABC | 2 |
| 0x102 | BCD | 2 |
| 0x103 | CDE | 2 |
| ... | ... | ... |
| 0x201 | BCD+ | 3 |

142b'

...

122n

| PHYSICAL ADDRESS | SSD DATA | ERASE COUNT |
|---|---|---|
| 0x101 | ZZZ | 10 |
| 0x102 | YYY | 9 |
| 0x103 | XXX | 11 |
| ... | ... | ... |
| 0x201 | ZZZ+ | 10 |
| 0x202 | YYY+ | 10 |

| PHYSICAL ADDRESS | SSD DATA | ERASE COUNT |
|---|---|---|
| 0x101 | AAA | 1 |
| 0x102 | BBB | 1 |
| 0x103 | CCC | 1 |
| ... | ... | ... |
| 0x201 | AAA+ | 2 |
| 0x202 | CCC+ | 2 |
| ... | ... | ... |
| 0x301 | ZZZ | 2 |
| 0x302 | YYY | 2 |
| 0x303 | XXX | 2 |

122a / 142a''

| PHYSICAL ADDRESS | SSD DATA | ERASE COUNT |
|---|---|---|
| 0x101 | ABC | 2 |
| 0x102 | BCD | 2 |
| 0x103 | CDE | 2 |
| ... | ... | ... |
| 0x201 | BCD+ | 3 |
| ... | ... | ... |
| 0x301 | BCD | 3 |

122b / 142b''

| PHYSICAL ADDRESS | SSD DATA | ERASE COUNT |
|---|---|---|
| 0x101 | ZZZ | 10 |
| 0x102 | YYY | 9 |
| 0x103 | XXX | 11 |
| ... | ... | ... |
| 0x201 | ZZZ+ | 10 |
| 0x202 | YYY+ | 10 |
| ... | ... | ... |
| 0x301 | AAA | 10 |
| 0x302 | BBB | 10 |
| 0x303 | CCC | 10 |

122n / 142n''

INFORMATION PROCESSING DEVICE FOR SYNCHRONIZING UPDATE INFORMATION BETWEEN A SOLID STATE DRIVE AND A BACKUP STORAGE

INCORPORATION BY REFERENCE

This application is based upon and claims the benefit of priority from Japanese patent application No. 2012-274359, filed on Dec. 17, 2012, the disclosure of which is incorporated herein in its entirety by reference.

TECHNICAL FIELD

The present invention relates to an information processing device, more specifically, relates to an information processing device that performs backup of data stored in a storage device.

BACKGROUND ART

There is a case that data stored in a storage device such as an SSD (Solid State Drive) is lost because of trouble, wrong operation, or the like. For restoration of lost data, backup, which is to copy data stored in a storage device into another storage device at predetermined timing, is performed in general (e.g., see Patent Document 1). Thus, even if the stored data is lost because of trouble, wrong operation, or the like, it is possible to restore the lost data by using the copy data stored in the other storage device.

For updating data on an SSD, there is a need to once erase data and then write update data onto the SSD. Because storage elements deteriorate every time data is written in and erased, the life of an SSD may become short in a case where data is frequently written in and erased. Thus, a technique of wear leveling, which is to distribute data writing or the like as evenly as possible to the storage elements of an SSD, is utilized for SSDs (e.g., see Patent Document 2).

[Patent Document 1] Japanese Unexamined Patent Application Publication No. JP-A 2007-233961

[Patent Document 2] Japanese Unexamined Patent Application Publication No. JP-A 2005-316793

Patent Document 1 describes a technique of storing management information including the version number of a backup job of previous backup, deciding data to be backed up based on the stored management information, and performing backup of data.

According to the technique described in Patent Document 1, there is a need to generate and manage management information in addition to executing a data backup process. Therefore, the technique described in Patent Document 1 requires update of the management information at the time of backup, and has a problem of increase of load relating to backup using an SSD.

SUMMARY

Accordingly, an object of the present invention is to provide an information processing device that can solve the problem of increase of load relating to backup using an SSD.

In order to achieve the above object, an information processing device in an aspect of the present invention includes:

an SSD storage controlling unit for storing predetermined data into an SSD (Solid State Drive), and also storing SSD update information in association with data identification information into the SSD, the SSD update information including a physical address of a storage region storing the stored data and a number of updates of the storage region, and the data identification information being for identifying the data;

a backup storage controlling unit for storing copy data of the data stored in the SSD, copy update information obtained by copying the SSD update information, and the data identification information, in association with each other into a backup storage part;

an acquiring unit for acquiring the SSD update information from the SSD, and also acquiring the copy update information associated with the same data identification information as the data identification information associated with the acquired SSD update information, from the backup storage part; and a deciding unit for deciding the data to be stored into the backup storage part based on the SSD update information and the copy update information acquired by the acquiring unit.

Further, an information processing method in another aspect of the present invention includes:

storing predetermined data into an SSD (Solid State Drive), and also storing SSD update information in association with data identification information into the SSD, the SSD update information including a physical address of a storage region storing the stored data and a number of updates of the storage region, and the data identification information being for identifying the data;

storing copy data of the data stored in the SSD, copy update information obtained by copying the SSD update information, and the data identification information, in association with each other into a backup storage part;

acquiring the SSD update information from the SSD, and also acquiring the copy update information associated with the same data identification information as the data identification information associated with the acquired SSD update information, from the backup storage part; and deciding the data to be stored into the backup storage part based on the acquired SSD update information and the acquired copy update information.

Further, in a non-transitory computer-readable medium storing a program in another aspect of the present invention, the program includes instructions for causing an information processing device to realize:

an SSD storage controlling unit for storing predetermined data into an SSD (Solid State Drive), and also storing SSD update information in association with data identification information into the SSD, the SSD update information including a physical address of a storage region storing the stored data and a number of updates of the storage region, and the data identification information being for identifying the data;

a backup storage controlling unit for storing copy data of the data stored in the SSD, copy update information obtained by copying the SSD update information, and the data identification information, in association with each other into a backup storage part;

an acquiring unit for acquiring the SSD update information from the SSD, and also acquiring the copy update information associated with the same data identification information as the data identification information associated with the acquired SSD update information, from the backup storage part; and a deciding unit for deciding the data to be stored into the backup storage part based on the SSD update information and the copy update information acquired by the acquiring unit.

According to the present invention, it is possible to reduce load relating to backup and restoration using an SSD.

BRIEF DESCRIPTION OF DRAWINGS

FIG. 5 is a diagram showing an example of the map table;

FIG. 6 is a diagram showing an example of backup information;

FIG. 7 is a diagram showing an example of the backup information;

FIG. 8 is a diagram showing an example of a map table;

FIG. 9 is a diagram showing an example of the data storage information;

FIG. 10 is a flowchart for describing a backup process;

FIG. 11 is a flowchart for describing an SSD update process;

FIG. 16 is a diagram showing an example of a map table;

FIG. 17 is a diagram showing an example of data storage information;

FIG. 20 is a diagram showing an example of the data storage information;

FIG. 24 is a diagram showing an example of the data storage information;

EXEMPLARY EMBODIMENT

First Exemplary Embodiment

Figure 12:
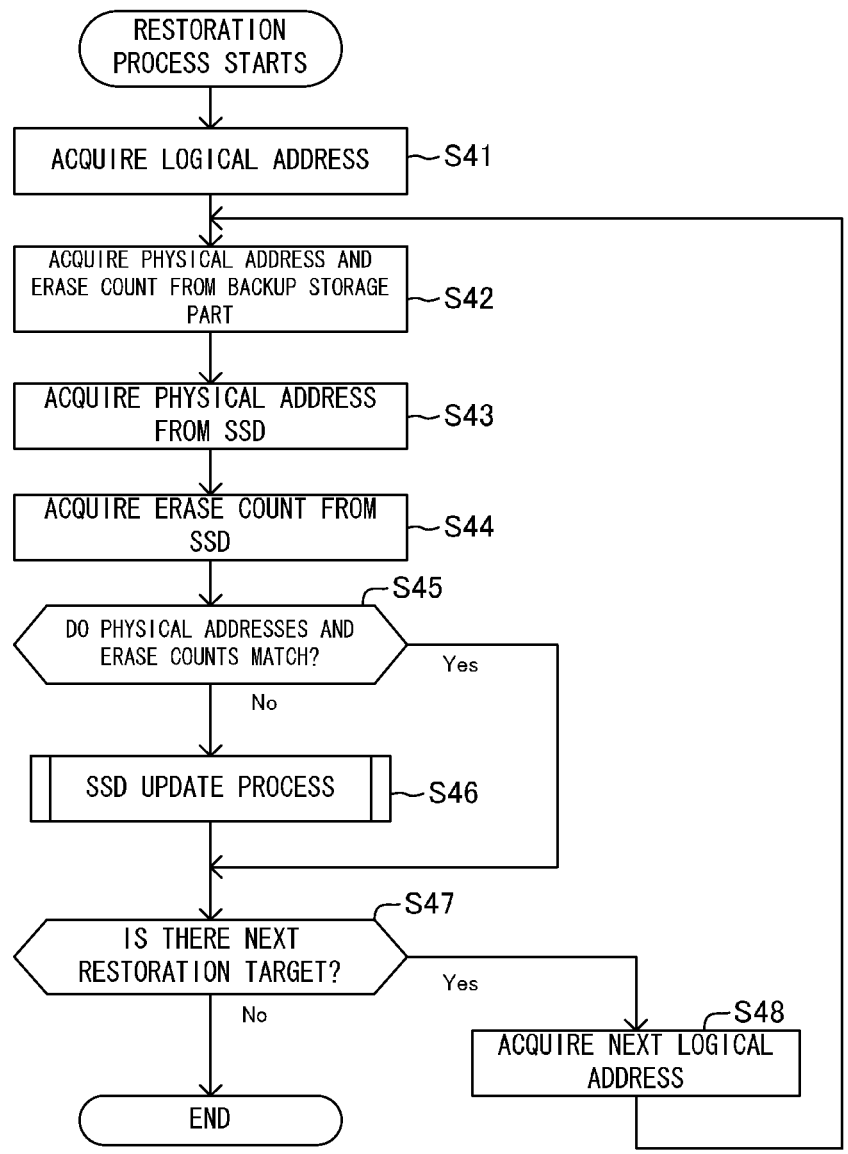
FIG. 12 is a flowchart for describing a restoration process.

First, a first exemplary embodiment of the present invention will be described referring to FIGS. 1 to 12. FIGS. 1 to 9 are diagrams for describing the configuration of an information processing device according to the first exemplary embodiment. FIGS. 10 to 12 are diagrams for describing the operation of the information processing device.

[Configuration]

Figure 1:
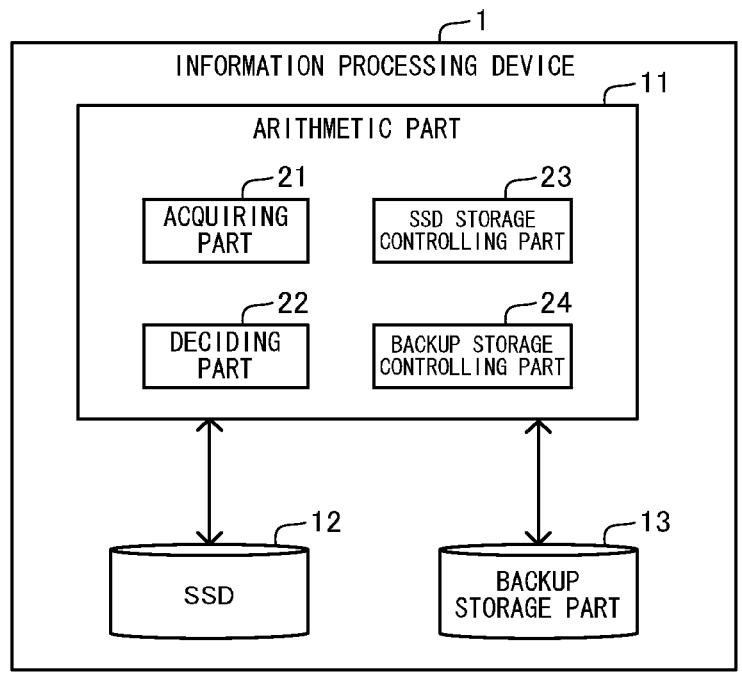
FIG. 1 is a block diagram showing the outline of the configuration of an information processing device according to a first exemplary embodiment of the present invention.

FIG. 1 is a block diagram showing the configuration of an information processing device 1 according to the first exemplary embodiment of the present invention. As shown in FIG. 1, the information processing device 1 includes an arithmetic part 11, an SSD 12, and a backup storage part 13. The information processing device 1 backs up data stored on the SSD 12 into the backup storage part 13. Moreover, when trouble or the like of the SSD 12 occurs, the information processing device 1 restores data on the SSD 12 based on the data stored in the backup storage part 13.

The arithmetic part 11 is configured by a CPU (Central Processing Unit), for example. The arithmetic part 11 loads a program previously stored in a storage device (not shown in the drawings) or the backup storage part 13, and executes the program, thereby having an acquiring part 21 (an acquiring unit), a deciding part 22 (a deciding unit), an SSD storage controlling part 23 (an SSD storage controlling unit), and a backup storage controlling part 24 (a backup storage controlling unit). The SSD storage controlling part 23 and the backup storage controlling part 24 may be configured by one storage controlling part. Below, the respective functions of the arithmetic part 11 will be described.

First, a process to update the SSD 12 will be described. Herein, it is assumed that the SSD 12 previously stores a map table 41A shown in FIG. 2 and data storage information 42A shown in FIG. 3. The map table 41A stores information that a logical address (data identification information) for identifying data and a physical address of a storage region (a data block) in which the data is actually stored are associated with each other. The data storage information 42A stores data stored in a storage region indicated by a physical address and an erase count of the storage region. On the SSD 12, at the time of update of data, data is erased first and then data to be updated (update data) is written. Therefore, at the time of update of data, the value of an erase count is counted up (incremented by 1).

In the process to update the SSD 12, first, the acquiring part 21 acquires update data via an input interface (not shown in the drawings) or the like. For example, the acquiring part 21 acquires "data A+" as update data for updating "data A." Upon acquiring the update data, the acquiring part 21 refers to the data storage information 42A in FIG. 3, detects a smallest value of erase counts, and acquires a physical address associated with an erase count of the detected value. For example, the acquiring part 21 acquires "physical address Z" associated with the smallest erase count.

Subsequently, the SSD storage controlling part 23 stores "data A+" into a storage region indicated by the acquired "physical address Z." The SSD storage controlling part 23 then increments the erase count by 1. For example, the SSD storage controlling part 23 stores "erase count Z" obtained by adding 1 to an erase count associated with "physical address Z," in association with "physical address Z" (e.g., see data storage information 42B in FIG. 4).

Figure 2:
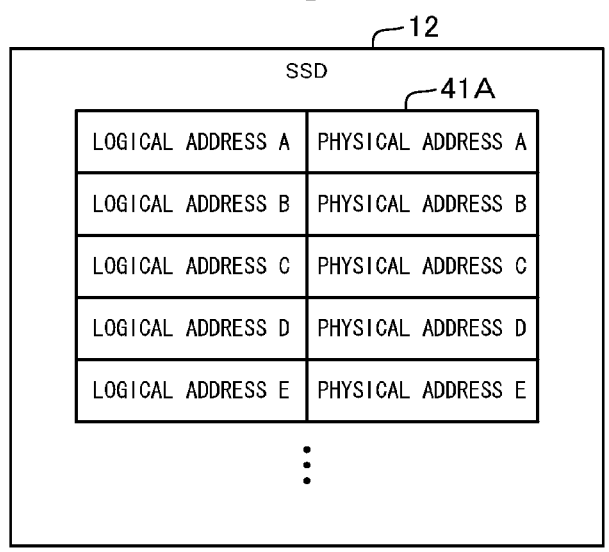
FIG. 2 is a diagram showing an example of a map table.

Next, because "data A" is to be updated, the acquiring part 21 refers to the data storage information 42A and acquires "physical address A" associated with "data A." Then, the acquiring part 21 refers to the map table 41A in FIG. 2 and acquires "logical address A" associated with "physical address A." Then, the SSD storage controlling part 23 stores "logical address A" and "physical address Z" in association with each other into the map table 41A (e.g., see a map table 41B shown in FIG. 5).

At the time of update of data stored on the SSD 12, a storage region (a data block) with the smallest erase count (number of updates) is detected and update data is stored into the detected storage region in the above manner, so that it is possible to prevent deterioration of the storage elements of the SSD 12 due to concentration of writing into the same storage region.

Next, a process to back up data stored on the SSD 12 into the backup storage part 13 will be described. Herein, assuming that backup data of the map table 41A in FIG. 2 and the data storage information 42A in FIG. 3 before update of the SSD 12 is previously stored in the backup storage part 13 as shown by backup information 51A in FIG. 6, a case of storing data stored on the SSD 12 after update shown by the map table 41B in FIG. 5 and the data storage information 42B in FIG. 4 into the backup storage part 13 will be described.

First, the acquiring part 21 refers to the map table 41B in FIG. 5, and acquires a logical address for identifying data to be backed up (e.g., "logical address A" indicating a first data block). Subsequently, the acquiring part 21 refers to the map table 41B in FIG. 5 to acquire "physical address Z" associated with the acquired "logical address A," and also refers to the data storage information 42B in FIG. 4 to acquire "erase count Z" associated with "physical address Z."

Next, the deciding part 22 refers to the backup information 51A in FIG. 6, and determines whether there is a backup or not. For example, the deciding part 22 determines whether backup data associated with "logical address A" is stored or not. In the example shown in FIG. 6, because backup data (copy data) associated with "logical address A" is stored in the backup storage part 13, the deciding part 22 determines that there is a backup, and the acquiring part 21 acquires "physical address A" and "erase count A" that are associated with "logical address A" from the backup information 51A.

Then, the deciding part 22 compares "physical address Z" acquired from the SSD 12 with "physical address A" acquired from the backup storage part 13 (determines whether the physical addresses match or not). Also, the deciding part 22 compares "erase count Z" acquired from the SSD 12 with "erase count Z" acquired from the backup storage part 13. Herein, the deciding part 22 determines that neither the physical addresses nor the erase counts match, and decides data associated with "logical address A" as a backup target. Also in the case of determining that either the physical addresses or the erase counts do not match, the deciding part 22 decides data associated with "logical address A" as a backup target. Thus, the deciding part 22 decides a backup target based on the physical address and the erase count stored on the SSD 12 and the physical address and the erase count stored in the backup storage part 13. On the other hand, in the case of determining that both the physical addresses associated with the logical address and the erase counts associated with the logical address match, respectively, the deciding part 22 determines whether there is a next backup target or not. This process will be described later.

Next, referring to the data storage information 42B in FIG. 4, the acquiring part 21 acquires "data A+" (data to be backed up) associated with "physical address Z." Subsequently, the backup storage controlling part 24 stores "physical address Z," "erase count Z" and "data A+," which are to be backed up, in association with "logical address A" (e.g., line 1 of backup information 51B in FIG. 7).

Next, the deciding part 22 determines whether there is a next backup target or not. For example, because "logical address B" is stored in a second data block of the map table 41B in FIG. 5, the deciding part 22 determines that there is a next backup target, and the acquiring part 21 acquires a next logical address (e.g., "logical address B"). After "logical address B" is acquired, the abovementioned process is repeated. For example, the acquiring part 21 acquires "physical address B" and "erase count B" that are associated with "logical address B," and the deciding part 22 refers to the backup information 51A in FIG. 6 to determine whether there is a backup associated with "logical address B" or not, and determines that there is a backup.

Subsequently, the acquiring part 21 acquires "physical address B" and "erase count B" that are associated with "logical address B" from the backup information 51A in the backup storage part 13. The deciding part 22 compares "physical address B" acquired from the SSD 12 with "physical address B acquired from the backup storage part 13, and also compares "erase count B" acquired from the SSD 12 with "erase count B" acquired from the backup storage part 13. Herein, because determining that both the physical addresses and the erase counts match, respectively, the deciding part 22 does not decide data associated with "logical address B" as a backup target, and determines whether there is a next backup target or not. Then, the abovementioned process is repeated.

Consequently, in order of "logical address C," "logical address D," "logical address E," . . . , all of the backup targets stored in the map table 41B in FIG. 5 are stored into the backup storage part 13 (e.g., see FIG. 7). Because backup is thus performed by deciding data to be backed up based on the physical addresses and the erase counts stored on the SSD 12 (SSD update information) and the physical addresses and the erase counts stored in the backup storage part 13 (copy update information), it is not necessary to separately generate or store management information or the like, and it is possible to reduce load at the time of backup.

Next, a process to restore data stored on the SSD 12 based on data stored in the backup storage part 13 will be described. Herein, a case of restoring the map table 41B in FIG. 5 and the data storage information 42B in FIG. 4 that are stored on the SSD 12 based on the backup information 51A in FIG. 6 will be described.

First, the acquiring part 21 refers to the backup information 51A in FIG. 6, and acquires a logical address for identifying data to be restored (e.g., "logical address A" indicating a first data block). Subsequently, the acquiring part 21 acquires "physical address A" and "erase count A" that are associated with "logical address A" from the backup information 51A.

Figure 4:
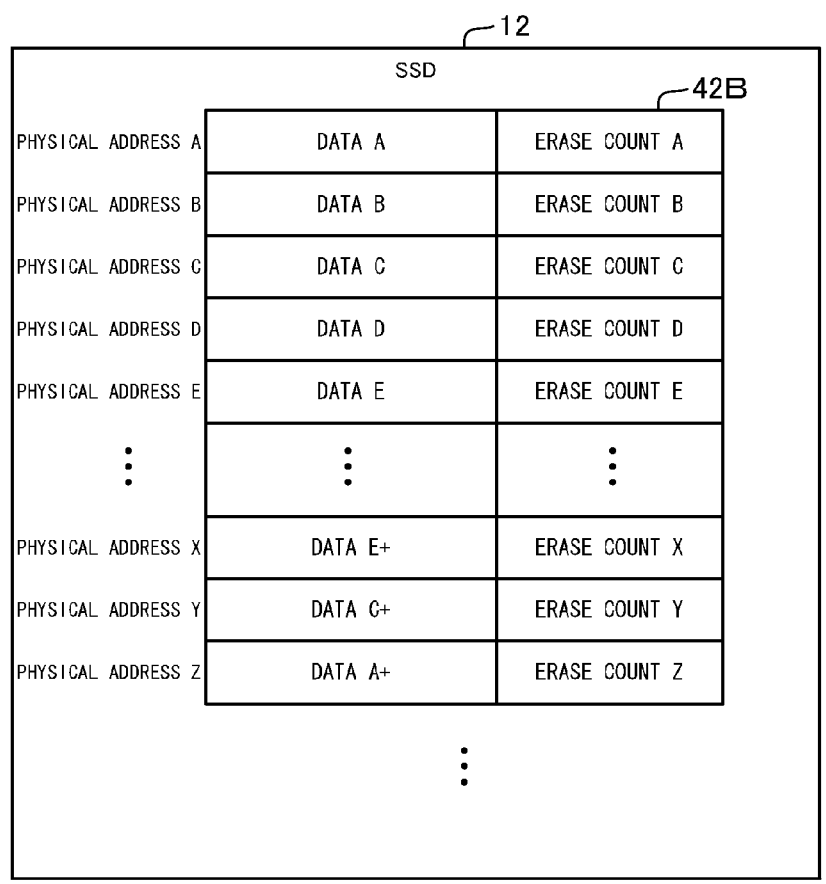
FIG. 4 is a diagram showing an example of the data storage information.

Next, the acquiring part 21 refers to the map table 41B in FIG. 5, and acquires "physical address Z" associated with "logical address A." Further, the acquiring part 12 refers to the data storage information 42B in FIG. 4, and acquires "erase count Z" associated with "physical address Z."

The deciding part 22 determines whether the physical addresses and the erase counts match or not, respectively. For example, the deciding part 22 compares "physical address A" acquired from the backup storage part 13 with "physical address Z" acquired from the SSD 12. Likewise, the deciding part 22 also compares "erase count A" acquired from the backup storage part 13 with "erase count Z" acquired from the SSD 12. Herein, the deciding part 22 determines that neither the physical addresses nor the erase counts match, and decides data associated with "logical address A" as a restoration target. In the case of determining that either the physical addresses or the erase counts do not match, the deciding part 22 also decides the data associated with "logical address A" as a restoration target.

Subsequently, the information processing device 1 executes the process to update the SSD 12 described above. To be specific, first, the acquiring part 21 refers to the backup information 51A in FIG. 6, and acquires "data A" associated with "physical address A" as update data. Next, the acquiring part 21 acquires a physical address with the smallest erase count from the SSD 12. To be specific, the acquiring part 21 refers to the data storage information 42B in FIG. 4 to detect a smallest value of erase counts, and acquires a physical address associated with an erase count of the detected value. For example, the acquiring part 21 acquires "physical address AA" with the smallest erase count. Subsequently, the SSD storage controlling part 23 stores "data A" into a storage region indicated by "physical address AA." Moreover, the SSD storage controlling part 23 stores "erase count AA" obtained by adding 1 to the erase count associated with "physical address AA," in association with "physical address AA" (e.g., see data storage information 42C in FIG. 9).

Next, the acquiring part 21 acquires a logical address of an update target. For example, the acquiring part 21 acquires "logical address A" as a logical address of an update target as described above. The SSD storage controlling part 23 associates the acquired "logical address A" and "physical address AA" and stores into the map table 41 (e.g., see line 1 of a map table 41C in FIG. 8).

Next, the deciding part 22 determines whether there is a next restoration target or not. For example, the deciding part 22 refers to the backup information 51A in FIG. 6, and determines whether predetermined information (e.g., a physical address, etc.) is stored in a second data block or not. Because predetermined information is stored in the second data block of the backup information 51A in FIG. 6, the deciding part 22 determines that there is a next restoration target, and the acquiring part 21 acquires a next logical address (e.g., "logical address B").

After "logical address B" is acquired, the abovementioned process is repeated. For example, the acquiring part 21 acquires "physical address B" and "erase count B" that are associated with "logical address B" from the backup storage part 13 (the backup information 51A in FIG. 6), and acquires "physical address B" and "erase count B" that are associated with "logical address B" from the SSD 12. Then, the deciding part 22 compares "physical address B" acquired from the backup storage part 13 with "physical address B" acquired from the SSD 12, and also compares "erase count B" acquired from the backup storage part 13 with "erase count B" acquired from the SSD 12. Herein, because determining that both the physical addresses and the erase counts match, respectively, the deciding part 22 does not decide data associated with "logical address B" as a restoration target, and determines whether there is a next backup target or not. Then, the abovementioned process is repeated.

Consequently, in order of "logical address C," "logical address D," "logical address E," ..., all of the restoration targets are stored onto the SSD 12 based on the backup information 51A in FIG. 6 (e.g., see FIGS. 8 and 9). Because restoration of data is thus performed by deciding data to be restored based on the physical addresses and erase counts stored on the SSD 12 (SSD update information) and the physical addresses and erase counts stored in the backup storage part 13 (copy update information), it is not necessary to separately generate or store management information or the like and it is possible to reduce load at the time of restoration, as in the backup process.

[Operation]

Next, referring to FIGS. 10 to 12, an operation of the information processing device 1 will be described. FIG. 10 is a flowchart for describing a backup process by the information processing device 1. FIG. 11 is a flowchart for describing an SSD update process by the information processing device 1. FIG. 12 is a flowchart for describing a restoration process by the information processing device.

Figure 3:
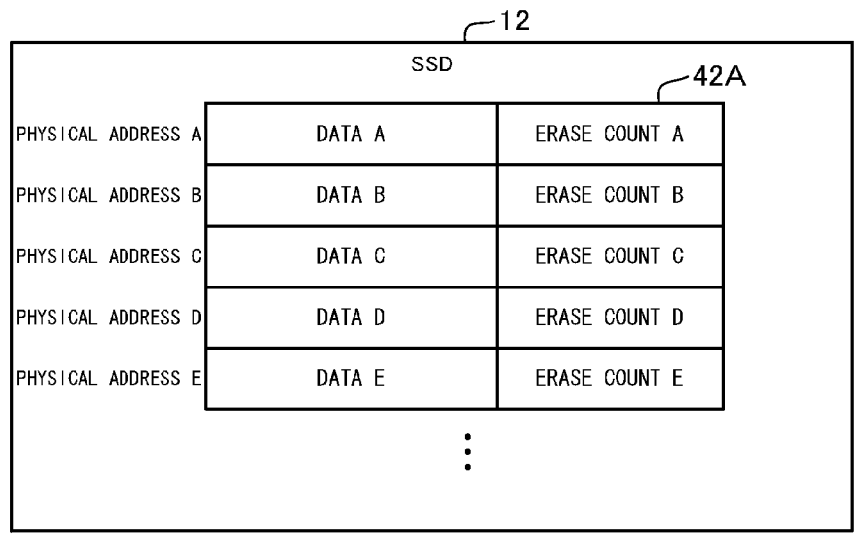
FIG. 3 is a diagram showing an example of data storage information.

The backup process shown in FIG. 10 will be described, first, by using a case of storing the map table 41A in FIG. 2 and the data storage information 42A in FIG. 3 that are stored on the SSD 12 into the backup storage part 13. The backup process shown in FIG. 10 starts, for example, when backup of the SSD 12 is requested or at predetermined timing (e.g., regularly).

First, the acquiring part 21 acquires a logical address for identifying data to be backed up (step S1). For example, the acquiring part 21 refers to the map table 41A in FIG. 2, and acquires "logical address A" indicating a first data block. Subsequently, the acquiring part 21 acquires a physical address from the SSD 12 (step S2). For example, the acquiring part 21 refers to the map table 41A, and acquires "physical address A" associated with "logical address A" acquired in step S1. Further, the acquiring part 21 acquires an erase count from the SSD 12 (step S3). For example, the acquiring part 21 refers to the data storage information 42A in FIG. 3, and acquires "erase count A" associated with "physical address A" acquired in step S2.

Next, the deciding part 22 refers to the backup storage part 13, and determines whether there is a backup or not (step S4). Herein, because backup is performed for the first time, the deciding part 22 determines that there is no backup with respect to all of the backup targets. Thus, the deciding part 22 determines that there is no backup (step S4: No), and the process proceeds to step S7 while steps S5 and S6 are omitted. Steps S5 and S6 will be described later.

Next, in step S7, the acquiring part 21 acquires data from the SSD 12 (step S7). For example, the acquiring part 21 refers to the data storage information 42A in FIG. 3, and acquires "data A" associated with "physical address A" acquired in step S2. Subsequently, the backup storage controlling part 24 stores the physical address, the erase count, and the data, which are to be backed up, into the backup storage part 13 (step S8). For example, the backup storage controlling part 24 stores "physical address A," "erase count A" and "data A" acquired in steps S2, S3 and S7, respectively, in association with "logical address A" acquired in step S1 (e.g., line 1 of the backup information 51A in FIG. 6).

Next, the deciding part 22 determines whether there is a next backup target or not (step S9). For example, the deciding part 22 refers to the map table 41A in FIG. 2, and determines whether a logic address is stored in a second data block or not. In the example shown in FIG. 2, because "logical address B" is stored in the second data block, the deciding part 22 determines that there is a next backup target (step S9: Yes). Then, the acquiring part 21 acquires a next logical address (step S10). For example, the acquiring part 21 acquires "logical address B" indicating the second data block as the next logical address.

After step S10, the process returns to step S2, and steps S2 and later will be repeated. As a result, in order of "logical address B," "logical address C," "logical address D," ..., all of the backup targets stored in the map table 41A are stored into the backup storage part 13 (e.g., see FIG. 4). Thus, it is possible to make a backup of the SSD 12.

Next, an SSD update process to update part of data on the SSD 12 will be described by referring to FIG. 11. In the SSD update process, first, the acquiring part 21 acquires update data via an input interface (not shown in the drawings) (step S21). For example, the acquiring part 21 acquires "data A+" as update data for updating "data A."

Upon acquiring update data, the acquiring part 21 acquires a physical address with the smallest erase count (step S22). To be specific, the acquiring part 21 refers to the data storage information 42A in FIG. 3 to detect a smallest value of erase counts, and acquires a physical address associated with an erase count of the detected value. For example, the acquiring part 21 acquires "physical address Z" as a physical address with the smallest erase count.

Subsequently, the SSD storage controlling part 23 stores the update data (step S23). For example, the SSD storage controlling part 23 stores "data A+" acquired in step S21 into a storage region indicated by "physical address Z" acquired in step S22. Further, the SSD storage controlling part 23 increments the erase count by 1 (step S24). For example, the SSD storage controlling part 23 stores "erase count Z" obtained by adding 1 to the erase count associated with "physical address Z," in association with "physical address Z."

Next, the acquiring part 21 acquires a logical address of an update target (step S25). For example, because an update target is "data A," the acquiring part 21 refers to the data storage information 42A and acquires "physical address A" associated with "data A." Then, the acquiring part 21 refers to the map table 41A in FIG. 2 and acquires "logical address A" associated with "physical address A." The SSD storage controlling part 23 associates and stores the logical address acquired in step S25 and the physical address acquired in step S22 (step S26). For example, the SSD storage controlling part 23 associates and stores "logical address A" and "physical address Z" into the map table 41A (e.g., see FIG. 5). After step S26, the SSD update process shown in FIG. 11 ends.

Thus, at the time of update of data stored on the SSD 12, a storage region (a data block) with the smallest number of updates (erase count) is detected and update data is stored into the detected storage region, so that it is possible to prevent deterioration of the storage elements of the SSD due to concentration of writing into the same storage region. Further, because the physical address of the detected storage region and the number of updates obtained by adding 1 to the number of updates of the storage region are stored in association with the logical address (data identification information) as new SSD update information, it is possible to use the SSD update information again when deciding a backup target. However, the SSD update process is not limited to the operation described above, and can be any operation as far as at least one of the physical address and the erase count is changed and a combination of the same physical address and erase count is not made no matter how many times the SSD update process is executed.

An example of the SSD 12 after update is shown in FIGS. 5 and 6. It is assumed that the SSD update process shown in FIG. 11 is executed and thereby "logical address A," "logical address C" and "logical address E" are updated as shown in the map table 41B in FIG. 5. To be specific, as shown by the data storage information 42B in FIG. 4, it is assumed that "physical address A" associated with "logical address A" is updated to "physical address Z," "data A" is updated to "data +A," and "erase count A" is updated to "erase count Z." Moreover, it is assumed that "physical address C" associated with "logical address C" is updated to "physical address Y," "data C" is updated to "data +C," and "erase count C" is updated to "erase count Y." Moreover, it is assumed that "physical address E" associated with "logical address E" is updated to "physical address X," "data E" is updated to "data +E," and "erase count E" is updated to "erase count X."

An operation of executing a backup process again after the SSD 12 is updated in the above manner will be described below. First, the acquiring part 21 acquires a logical address (e.g., "logical address A") for identifying data to be backed up (step S1), and then acquires a physical address (e.g., "physical address Z") and an erase count (e.g., "erase count Z") that are associated with the acquired logical address (steps S2 and S3).

Next, the deciding part 22 refers to the backup storage part 13, and determines whether there is a backup or not (step S4). For example, because information associated with "logical address A" is stored in the backup information 51A in FIG. 6, the deciding part 22 determines that there is a backup (step S4: Yes).

Subsequently, the acquiring part 21 acquires a physical address and an erase count from the backup storage part 13 (step S5). For example, the acquiring part 21 acquires "physical address A" and "erase count A" that are associated with "logical address A" acquired in step S1, from the backup information 51A. The deciding part 22 determines whether the physical addresses and the erase counts match or not, respectively (step S6). For example, the deciding part 22 compares "physical address Z" acquired in step S2 with "physical address A" acquired in step S5. Likewise, the deciding part 22 also compares "erase count Z" acquired in step S3 with "erase count Z" acquired in step S5. Herein, the deciding part 22 determines that neither the physical addresses nor the erase counts match (step S6: No), and the process proceeds to step S7. Also when determining that either the physical addresses or the erase counts do not match, the deciding part 22 determines No in step S6, and the process proceeds to step S7. Thus, the determining part 22 decides a backup target based on the physical addresses and the erase counts stored on the SSD 12 and the physical addresses and erase counts stored in the backup storage part 13.

In step S7, the acquiring part 21 acquires data (data to be backed up) from the SSD 12 (step S7). For example, the acquiring part 21 refers to the data storage information 42B in FIG. 4, and acquires "data A+" associated with "physical address Z" acquired in step S2. Subsequently, the backup storage controlling part 24 stores the physical address, the erase count and the data, which are to be backed up, into the backup storage part 13 (step S8). For example, the backup storage controlling part 24 stores "physical address Z," "erase count Z" and "data A+" acquired in steps S2, S3 and S7, respectively, in association with "logical address A" acquired in step S1 (e.g., line 1 of the backup information 51B in FIG. 7).

Next, the deciding part 22 determines whether there is a next backup target or not (step S9). For example, because "logical address B" is stored in a second data block in the map table 41B of FIG. 5, the deciding part 22 determines that there is a next backup target (step S9: Yes). The acquiring part 21 acquires a next logical address (e.g., "logical address B") (step S10).

After "logical address B" is acquired, the process returns to step S2, and steps 2 and later are repeated. For example, "physical address B" and "erase count B" that are associated with "logical address B" are acquired (steps S2 and S3). Next, the deciding part 22 refers to the backup information 51A in FIG. 6 to determine whether there is a backup associated with "logical address B" or not (step S4), and determines that there is a backup (step S4: Yes).

Subsequently, the acquiring part 21 acquires "physical address B" and "erase count B" that are associated with "logical address B" from the backup storage part 13 (step S5). The deciding part 22 compares "physical address B" acquired in step S2 with "physical address B acquired in step S5, and also compares "erase count B" acquired in step S3 with "erase count B" acquired in step S5. Herein, the deciding part 22 determines that both the physical addresses and the erase counts match, respectively (step S6: Yes), and the process proceeds to step S9. Then, as mentioned above, steps S9 and later are repeated.

Consequently, in order of "logical address C," "logical address D," "logical address E," . . . , all of the backup targets stored in the map table 41B in FIG. 5 are stored into the backup storage part 13 (e.g., see FIG. 7). Because backup is thus performed by deciding data to be backed up based on the physical address and the erase count stored on the SSD 12 (SSD update information) and the physical address and the erase count stored in the backup storage part 13 (copy update information), it is not necessary to separately generate or store management information or the like, and it is possible to decrease load at the time of backup.

Next, a restoration process will be described by referring to FIG. 12. This restoration process will be described by using a case of restoring the map table 41B in FIG. 5 and the data storage information 42B that are stored on the SSD based on the backup information 51A in FIG. 6. The restoration process shown in FIG. 12 starts, for example, in a case where restoration to the SSD 12 is requested or at predetermined timing (e.g., regularly).

First, the acquiring part 21 acquires a logical address for identifying data to be restored (step S41). For example, the acquiring part 21 refers to the backup information 51A in FIG. 6 and acquires "logical address A" indicating a first data block. Subsequently, the acquiring part 21 acquires a physical address and an erase count from the backup storage part 13 (step S42). For example, the acquiring part 21 acquires "physical address A" and "erase count A" that are associated with "logical address A" acquired in step S41, from the backup information 51A.

Next, the acquiring part 21 acquires a physical address from the SSD 12 (step S43). For example, the acquiring part 21 refers to the map table 41B in FIG. 5 and acquires "physical address Z" associated with "logical address A" acquired in step S41. Moreover, the acquiring part 21 acquires an erase count from the SSD 12 (step S44). For example, the acquiring part 21 refers to the data storage information 42B in FIG. 4 and acquires "erase count Z" associated with "physical address A" acquired in step S43.

The deciding part 22 determines whether the physical counts and the erase counts match or not, respectively (step S45). For example, the deciding part 22 compares "physical address A" acquired in step S42 with "physical address Z" acquired in step S43. Likewise, the deciding part 22 also compares "erase count A" acquired in step S42 with "erase count Z" acquired in step S44. In this case, the deciding part 22 determines that neither the physical addresses nor the erase counts match (step S45: No), and the process proceeds to step S46. Also when determining that either the physical addresses or the erase counts do not match, the deciding part 22 determines No, and the process proceeds to step S46. Thus, the deciding part 22 decides a restoration target based on the physical addresses and the erase counts stored on the SSD 12 and the physical addresses and the erase counts stored in the backup storage part 13.

Subsequently, in step S46, the information processing device 1 executes the SSD update process shown in FIG. 11 (step S46). In the SSD update process in step S46, first, the acquiring part 21 acquires update data from the backup storage part 13 (step S21). For example, the acquiring part 21 refers to the backup information 51A in FIG. 6 and acquires "data A" associated with "physical address A" acquired in step S42 in FIG. 12, as update data.

Next, the acquiring part 21 acquires a physical address with the smallest erase count from the SSD 12 (step S22). For example, the acquiring part 21 acquires "physical address AA" with the smallest erase count. Subsequently, the SSD storage controlling part 23 stores the update data acquired in step S21 (step S23). For example, the SSD storage controlling part 23 stores "data A" acquired in step S21 into a storage region indicated by "physical address AA" acquired in step S22. Further, the SSD storage controlling part 23 increments the erase count by 1 (step S24). For example, the SSD storage controlling part 23 stores "erase count AA" obtained by adding 1 to the erase count associated with "physical address AA," in association with "physical address AA" (e.g., see data storage information 42C in FIG. 9).

Next, the acquiring part 21 acquires a logical address of an update target (step S25). Herein, the acquiring part 21 acquires "logical address A" acquired in step S41 (or in step S48 to be described later) in FIG. 12. Because a logical address of an update target is acquired in step S41 (S48), step S25 may be omitted in the restoration process. Then, the SSD storage controlling part 23 stores the logical address acquired in step S25 (S41, S48) and the physical address acquired in step S22 in association with each other (step S26). For example, the SSD storage controlling part 23 associates "logical address A" and "physical address AA," and stores into the map table 41 (e.g., see line 1 of the map table 41C in FIG. 8). After step S26, the SSD update process shown in FIG. 11 ends, and the process proceeds to step S47 in FIG. 12.

Next, the deciding part 22 determines whether there is a next restoration target or not (step S47). For example, the deciding part 22 refers to the backup information 51A in FIG. 6, and determines whether predetermined information (e.g., a physical address or the like) is stored in a second data block or not. In the example shown in FIG. 2, because predetermined information is stored in the second data block, the deciding part 22 determines that there is a next restoration target (step S47: Yes). The acquiring part 21 acquires a next logical address (step S48). For example, the acquiring part 21 acquires "logical address B" indicating the second data block, as the next logical address.

After "logical address B" is acquired, the process returns to step S42, and steps S42 and later are repeated. For example, the acquiring part 21 acquires "physical address B" and "erase count B" that are associated with "logical address B" from the backup storage part 13 (the backup information 51A in FIG. 6) (step S42). Further, the acquiring part 21 acquires "physical address B" and "erase count B" that are associated with "logical address B" from the SSD 12 (steps S43 and S44).

The deciding part 22 compares "physical address B" acquired in step S42 with "physical address B" acquired in step S43, and also compares "erase count B" acquired in step S42 with "erase count B" acquired in step S44. Herein, the deciding part 22 determines that both the physical addresses and the erase counts match, respectively (step S45: Yes), the SSD update process in step S46 is omitted, and the process proceeds to step S47. Then, steps S47 and later are repeated as mentioned above.

As a result, in order of "logical address C," "logical address D," "logical address E," . . . , all of the restoration targets are stored onto the SSD 12 based on the backup information 51A in FIG. 6 (e.g., see FIGS. 8 and 9). Because restoration of data is performed by deciding data to be restored based on the physical addresses and the erase counts stored on the SSD 12 (SSD update information) and the physical addresses and the erase counts stored in the backup storage part 13 (copy update information), it is not necessary to separately generate or store management information or the like, and it is possible to decrease load at the time of restoration.

Second Exemplary Embodiment

Next, a second exemplary embodiment of the present invention will be described by referring to FIGS. 13 to 28. FIGS. 13 to 24 are diagrams for describing a configuration of an information processing device. FIGS. 25 to 28 are diagrams for describing an operation of the information processing device. The second exemplary embodiment is different from the first exemplary embodiment in that an information processing device 101 includes a RAID (Redundant Arrays of Inexpensive Disks) system that controls a plurality of SSDs 12. The remaining part of the configuration is the same as in the first exemplary embodiment.

[Configuration]

Figure 13:
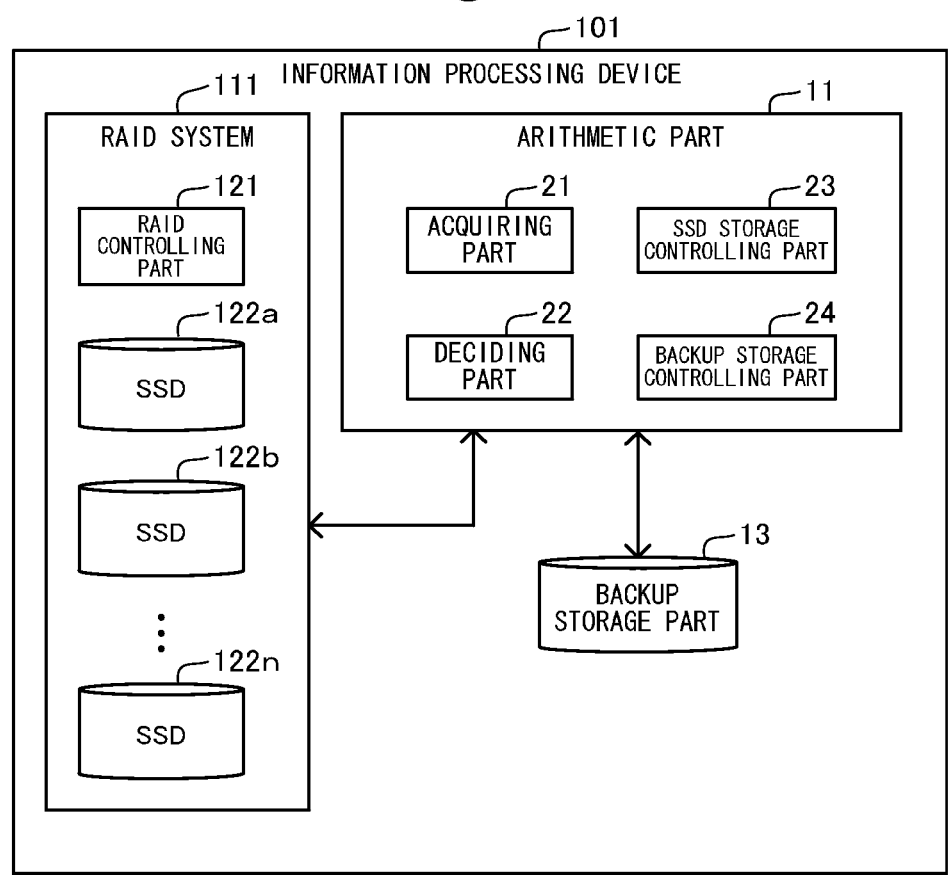
FIG. 13 is a block diagram showing the outline of the configuration of an information processing device according to a second exemplary embodiment of the present invention.

First, the configuration of the information processing device 101 in the second exemplary embodiment will be described by referring to FIG. 13. The same structural elements as those of the information processing device 1 of the first exemplary embodiment are denoted by the same reference numerals. That is to say, the information processing device 101 shown in FIG. 13 is different from the information processing device 1 shown in FIG. 1 in including a RAID system 111, and the remaining part of the configuration is the same as in the information processing device 1 shown in FIG. 1. Therefore, a difference part of the configuration from the information processing device 1 will be described specifically.

Figure 14:
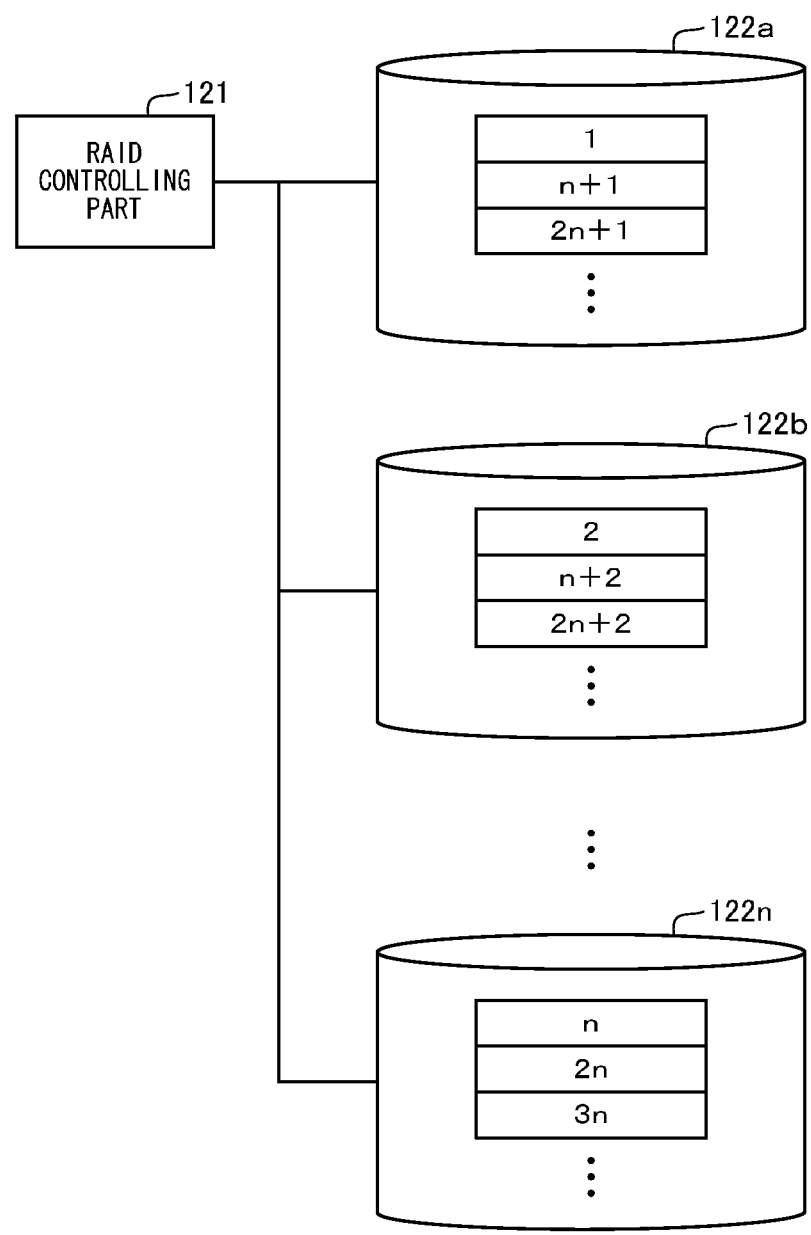
FIG. 14 is a block diagram showing the outline of the configuration of a RAID system.
Figure 15:
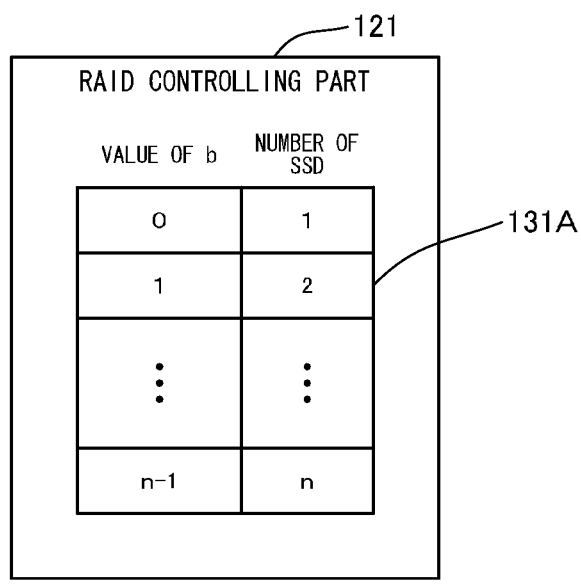
FIG. 15 is a diagram showing an example of an SSD specification table.

The RAID system 111 includes a plurality of SSDs 112, namely, SSDs 122a, 122b, . . . , 122n. The RAID system 111 has a configuration of RAID 0 (striping) as shown in FIG. 14, for example. In the case of controlling n SSDs 122 (n denotes a natural number), an SSD controlling part 121 divides consecutive data (e.g., data stored in 3n data blocks) into n, writes into the respective SSDs 122 in order, and manages as shown in FIG. 14. Therefore, it is possible to manage the plurality of SSDs 122 as one storage device. The RAID configuration is not limited to RAID 0, and may be another RAID configuration such as RAID 5 and RAID 10.

The RAID controlling part 121 has the logical address of RAID managed by the RAID controlling part 121, a list of the SSDs 122 for managing the SSDs 122 within the RAID system 111, and an SSD specification table (e.g., a specification table 131A shown in FIG. 15) for specifying an SSD 122 to be accessed. Information owned by the RAID controlling part 121 is stored in a storage device (not shown in the drawings) and managed by the RAID controlling part 121. The RAID controlling part 121 calculates the number of an SSD 122 and the logical address of the SSD based on the logical address of RAID and the number of the SSDs 122 managed by the RAID controlling part 121. To be specific, the RAID controlling part 121 obtains the quotient that is the result of dividing the logical address of RAID by the number of the SSDs 122, as the logical address of an SSD 122 to be accessed, and also obtains the remainder as the number of the SSD 122. Then, the RAID controlling part 121 refers to the specification table (e.g., the SSD specification table 131A shown in FIG. 15) for specifying an SSD 122, and specifies the SSD 122 from the number of the SSD 122. Thus, the RAID controlling part 121 can specify an SSD 122 to be accessed.

Figure 18:
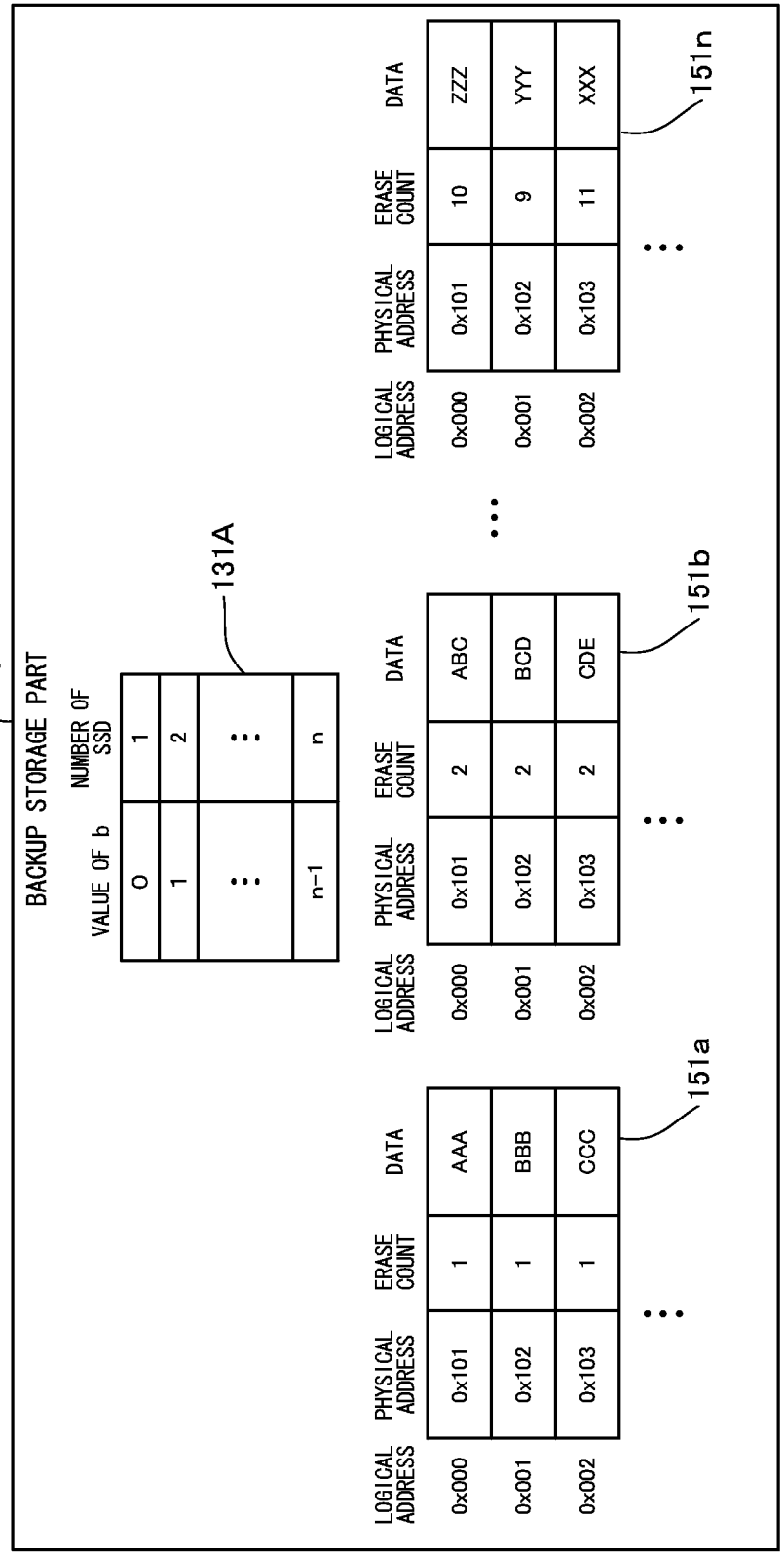
FIG. 18 is a diagram showing an example of backup information.

The SSDs 122a, 122b, . . . , 122n (the SSDs) store map tables 141a, 141b, . . . , 141n shown in FIG. 16 and data storage information 142a, 142b, . . . , 142n shown in FIG. 17 in association with each other, respectively. The backup storage part 13 stores backup information 151 in association with each of the SSDs 122 (to be specific, SSD specification information for specifying each of the SSDs 122) as shown in FIG. 18.

When executing a restoration process, the information processing device 101 executes a process to change a restoration destination SSD 122 based on the erase counts of the respective SSDs 122. Thus, it is possible to level the lives of the SSDs 122 within the RAID system 111.

To be specific, the acquiring part 21 acquires erase counts of all of the SSDs 122. For example, the acquiring part 21 acquires all erase counts from respective data storage information 142a', 142b', . . . , 142n' shown in FIG. 20 to be described later, and also acquires all erase counts for each of the SSDs 122 from respective backup information 151a, 151b, . . . , 151n shown in FIG. 18. The acquiring part 21 has only to acquire erase counts from at least either the SSDs 122 or the backup storage part 13.

Subsequently, the deciding part 22 calculates an average erase count of each of the SSDs 122 based on all of the acquired erase counts for each of the SSDs 122. For example, the deciding part 22 obtains "1.4, 2.25, . . . , 10.0" as average erase counts of the respective SSDs 122a, 122b, . . . , 122n. Likewise, the deciding part 22 obtains "1.0, 2.0, . . . , 9.9" as average erase counts of the SSDs 122a, 122b, . . . , 122n based on the respective backup information 151a, 151b, . . . , 151n. Although the deciding part 22 calculates the average value of erase counts, another statistical value such as the maximum value or median of erase counts may be used or the value of a specific erase count like an erase count associated with a first physical address may be used, because the information processing device 101 manages so as not to cause a bias in erase counts among the SSDs 122.

Then, the deciding part 22 decides a pair of SSDs to be replaced based on the calculated average erase counts. To be specific, the deciding part 22 compares average erase counts "1.4, 2.25, . . . , 10.0" based on the erase counts stored on the SSDs 122 with average erase counts "1.0, 2.0, . . . , 9.9" based on the erase counts stored in the backup storage part 13, and decides a pair of SSDs 122 between which a difference of the average erase counts is more than a preset threshold (e.g., 5) as a replacement target, in decreasing order of the difference. That is to say, the deciding part 22 compares a smaller one of the average erase counts with a larger one of the average erase counts in order, and decides as a replacement target when a difference of the average erase counts is more than the threshold.

For example, the deciding part 22 decides a pair of the SSD 122a and the SSD 122n as a replacement target, because different "9" between average erase count "10.0" of the SSD 122n and average erase count "1.0" of the SSD 122a stored in the backup storage part 13 is the largest and is more than threshold "5." Subsequently, for example, the deciding part 22 compares average erase count "2.0," which is the smallest of the average erase counts excluding the average erase counts of the SSDs 122a and 122n (i.e., the second smallest) and is of the SSD 122b stored in the backup storage part 13, with the average erase count (e.g., "6.0"), which is the second largest and is of the SSD 122c. In this case, because second largest difference "4.0" of the average erase counts is not more than threshold "5," the deciding part 22 ends the replacement target deciding process. If the average erase count of the SSD 122c is "7.5" and is the second largest, the second largest difference of the average erase counts is "5.5" and more than threshold "5," and therefore, the deciding part 22 decides a pair of the SSD 122b and the SSD 122c as a replacement target. Then, the deciding part 22 compares a third smallest average erase count with a third largest average erase count in the same manner as described above.

In a case where erase counts are acquired from only either the SSDs 122 or the backup storage part 13, the deciding part 22 decides a pair of SSDs 122 by comparing either within average erase counts "1.4, 2.25, . . . , 10.0" based on the erase counts stored on the SSDs 122 or within average erase counts "1.0, 2.0, . . . , 9.9" based on the erase counts stored in the backup storage part 13. For example, the deciding part 22 may decide a replacement target by comparing average erase count "1.4" of the SSD 122a with average erase count "10.0" of the SSD 122n. Likewise, the deciding part 22 may decide a replacement target by comparing average erase count "1.0" of the SSD 122a stored in the backup storage part 13 with average erase count "9.9" of the SSD 122n stored in the backup storage part 13.

Figure 22:
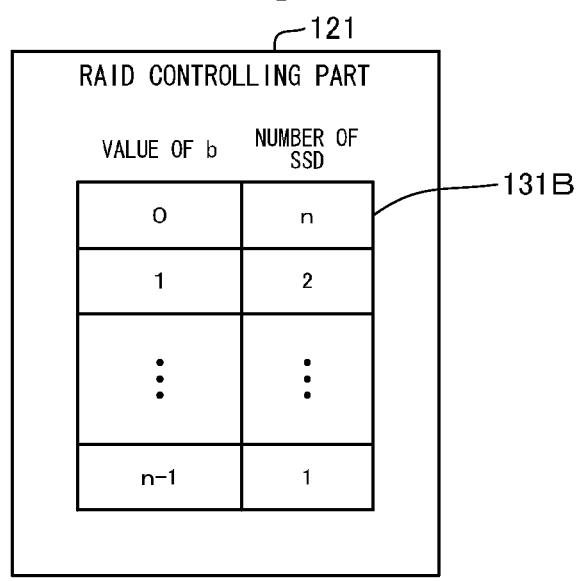
FIG. 22 is a diagram showing an example of the SSD specification table.

Then, based on the decided replacement target, the SSD storage controlling part 23 stores (updates) an SSD specification table 131B with the SSD numbers "1" and "n" replaced, into the RAID controlling part 121 as shown in FIG. 22, for example. Consequently, because the restoration process is executed based on the updated SSD specification table 131B, it is possible to change a restoration destination SSD 122 based on the erase counts of the respective SSDs 122.

[Operation]

Figure 25:
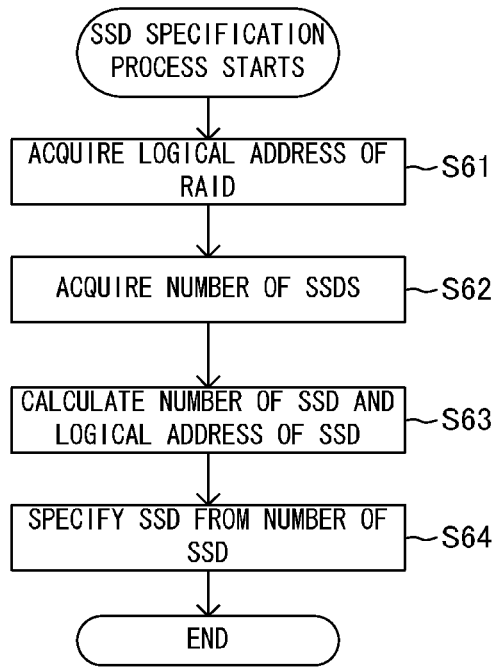
FIG. 25 is a flowchart for describing an SSD specification process.
Figure 26:
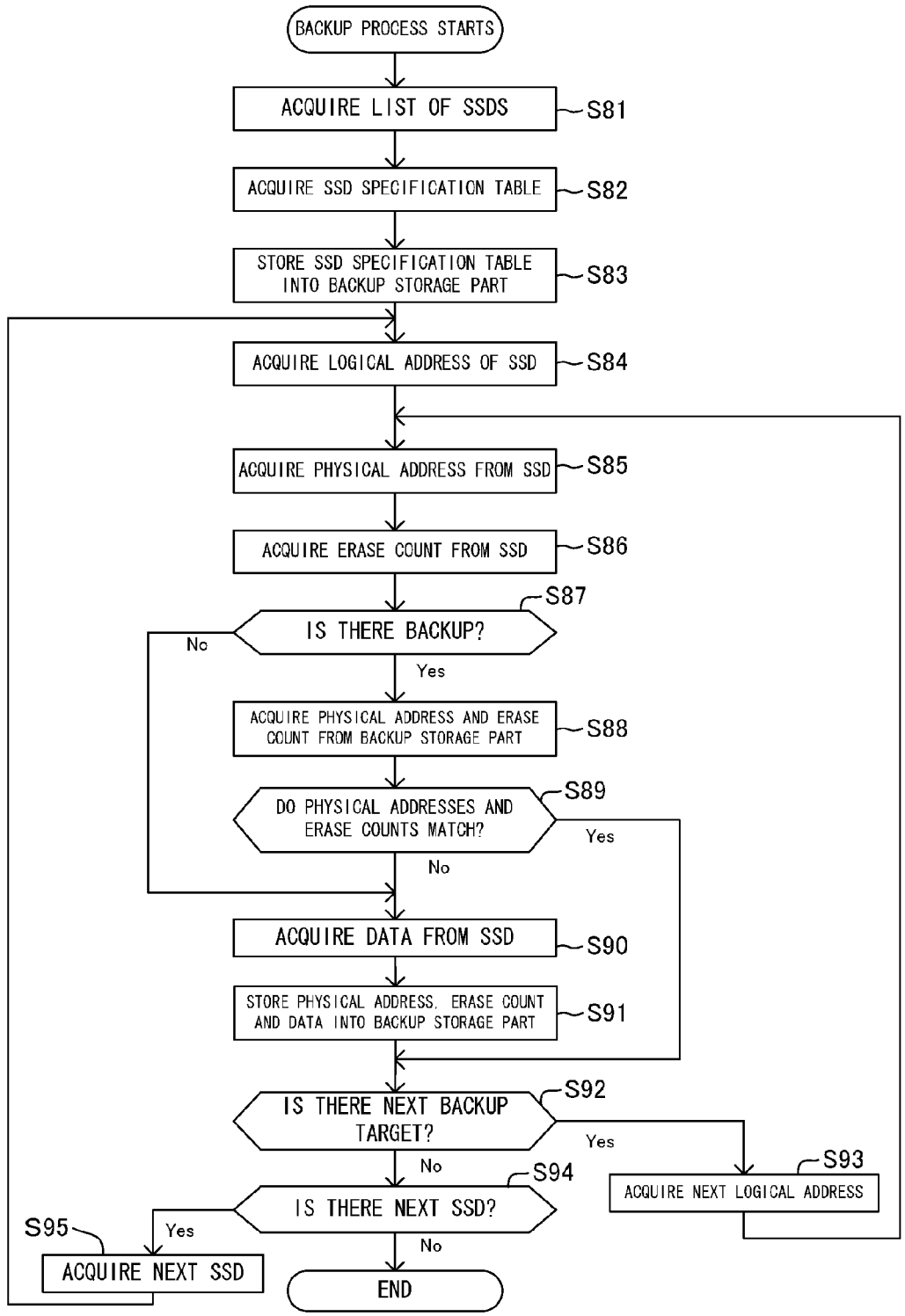
FIG. 26 is a flowchart for describing a backup process.
Figure 27:
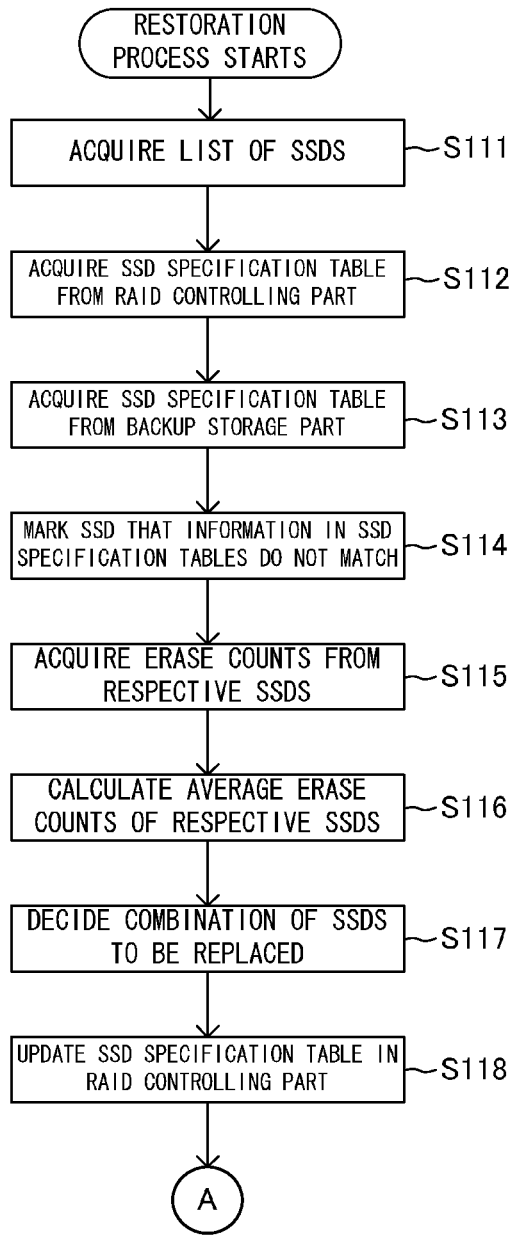
FIG. 27 is a flowchart for describing a restoration process.
Figure 28:
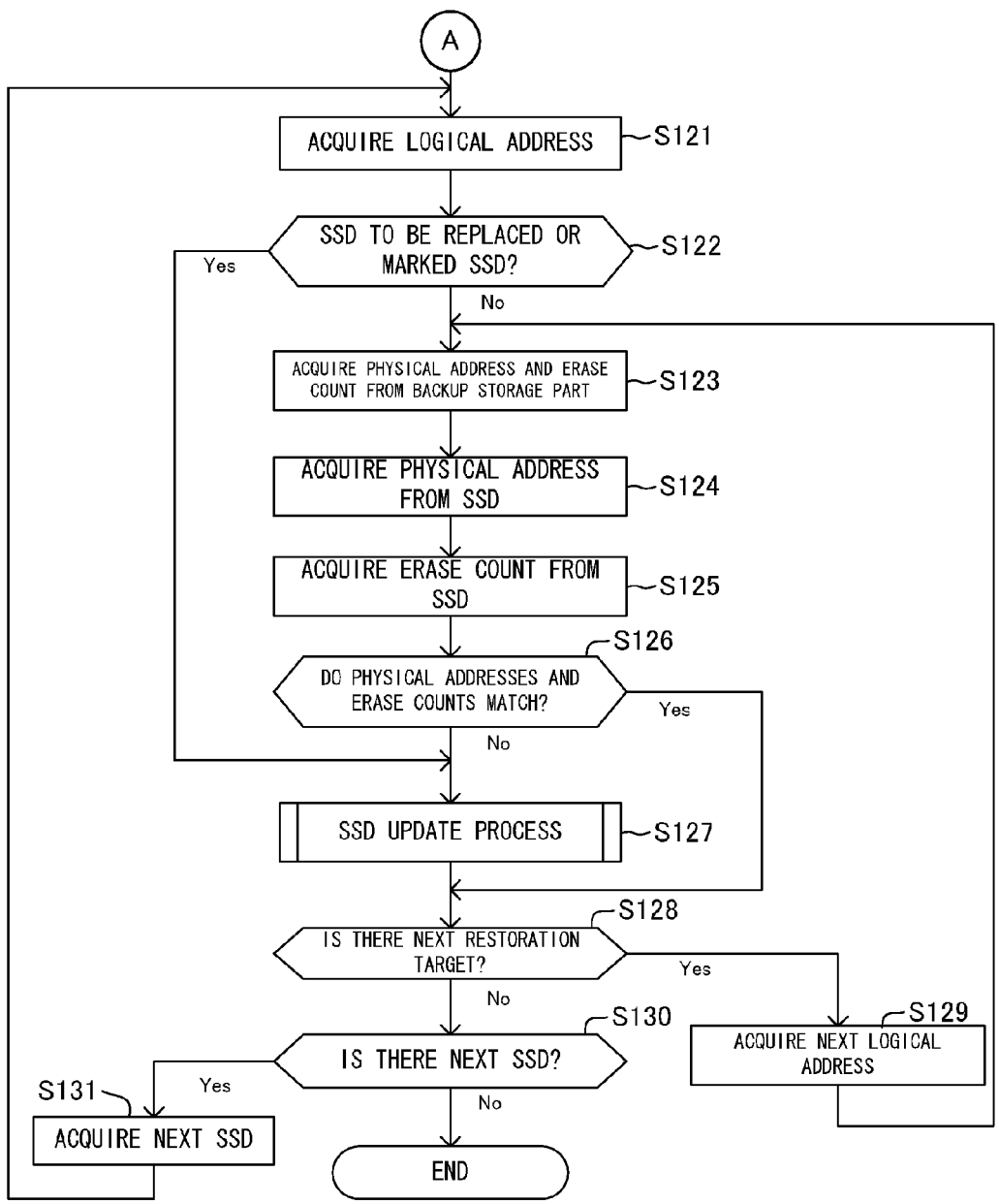
FIG. 28 is the flowchart for describing the restoration process.

Next, an operation of the information processing device 101 will be described by referring to FIGS. 25 to 28. FIG. 25 shows a flowchart for describing an SSD specification process by the information processing device 101. FIG. 26 shows a flowchart for describing a backup process by the information processing device 101. FIGS. 27 and 28 show a flowchart for describing a restoration process by the information processing device 101.

First, an SSD specification process to specify one SSD 122 from among the plurality of SSDs 122 in the RAID system 111 will be described by referring to FIG. 25. In the SSD specification process, first, the RAID controlling part 121 acquires the logical address of RAID managed by the RAID controlling part 121 (step S61). Subsequently, the RAID controlling part 121 acquires the number of the SSDs 122 (step S62). In the example shown in FIG. 14, the RAID controlling part 121 acquires the number "n" of the SSDs 122 managed by the RAID controlling part 121.

Then, the RAID controlling part 121 calculates the number of an SSD 122 and the logical address of the SSD 122. To be specific, first, the RAID controlling part 121 divides the logical address of RAID acquired in step S61 by the number of the SSDs 122 acquired in step S62, thereby obtaining the quotient as the logical address of an SSD 122 to be accessed and also obtaining the remainder as the number of the SSD 122. Subsequently, referring to a previously stored SSD specification table (e.g., the SSD specification table 131A shown in FIG. 15) for specifying an SSD 122, the RAID controlling part 121 specifies the SSD 122 from the calculated number of the SSD 122 (step S64). Thus, the RAID controlling part 121 can specify the SSD 122 to be accessed.

Next, a backup process by the information processing device 101 will be described by referring to FIG. 26. The backup process shown in FIG. 26 will be described by using a case of storing the map tables 141 in FIG. 16 stored on the SSDs 122 and the data storage information 142 in FIG. 17 into the backup storage part 13. The backup process shown in FIG. 26 starts, for example, when backup of the SSDs 122 is requested or at predetermined timing (e.g., regularly).

First, the acquiring part 21 acquires a list of the SSDs 122 from the RAID controlling part 121 (step S81). For example, the acquiring part 21 acquires "SSD122a, SSD 122b, . . . , SSD 122n" as the list of the SSDs 122. Subsequently, the acquiring part 21 acquires an SSD specification table 131 (e.g., the SSD specification table 131A shown in FIG. 15) from the RAID controlling part 121 (step S82). The backup storage controlling part 24 stores the SSD specification table 131 acquired in step S82 into the backup storage part 13 (e.g., see FIG. 18) (step S83).

Next, the acquiring part 21 acquires a logical address for identifying data to be backed up (step S84). For example, the acquiring part 21 selects the SSD 122a from the list acquired in step S81 and, referring to the map table 141a in FIG. 16, acquires logical address "0x000" indicating a first data block. Subsequently, the acquiring part 21 acquires a physical address from the SSD 122 (step S85). For example, the acquiring part 21 refers to the map table 141a, and acquires physical address "0x101" associated with logical address "0x000" acquired in step S84. Further, the acquiring part 21 acquires an erase count from the SSD 122 (step S86). For example, referring to data storage information 142a, the acquiring part 21 acquires erase count "1" associated with physical address "0x101" acquired in step S85.

Next, the deciding part 22 refers to the backup storage part 13, and determines whether there is a backup or not (step S87). Herein, because backup is performed for the first time, the deciding part 22 determines that none of backup targets are backed up. Therefore, the deciding part 22 determines that there is no backup (step S87: No), and the process proceeds to step S90 while steps S88 and S89 are omitted. Steps S88 and S89 will be described later.

Next, in step S90, the acquiring part 21 acquires data from the SSD 122 (step S90). For example, the acquiring part 21 refers to the data storage information 142a in FIG. 17, and acquires data "AAA" associated with physical address "0x101" acquired in step S85. Subsequently, the backup storage controlling part 24 stores the physical address, the erase count and the data that are to be backed up, into the backup storage part 13 (step S91). For example, the backup storage controlling part 24 stores physical address "0x101," erase count "1" and data "AAA" acquired in steps S85, S86 and S90, respectively, in association with logical address "0x000" acquired in step S84 (e.g., line 1 of the backup information 151a shown in FIG. 18).

Next, the deciding part 22 determines whether there is a next backup target or not (step S92). For example, the deciding part 22 refers to the map table 141a in FIG. 16, and determines whether a logical address is stored in a second data block or not. In the example shown in FIG. 16, because logical address "0x001" is stored in the second data block, the deciding part 22 determines that there is a next backup target (step S92: Yes). The acquiring part 21 acquires a next logical address (step S93). For example, the acquiring part 21 acquires logical address "0x001" stored in the second data block, as the next logical address.

After step S93, the process returns to step S85, and steps S85 and later are repeated. Consequently, all of the backup targets stored in the map table 141a are stored into the backup storage part 13 in order of logical address "0x001," "0x002," . . . (e.g., see FIG. 18). Thus, it is possible to make a backup of the SSD 122a.

On the other hand, in a case where it is determined in step S92 that there is no next backup target (step S92: No), the deciding part 22 refers to the list of the SSDs 122 acquired in step S81, and determines whether there is a next SSD 122 or not (step S94). Because the second SSD 122b is stored in the list of the SSDs 122 acquired in step S81, the deciding part 22 determines that there is a next backup target (step S94: Yes). The acquiring part 21 acquires a next SSD 122 (step S95). For example, the acquiring part 21 acquires the SSD 122b as the next SSD 122. After step S95, the process returns to step S84, and steps S84 and later are repeated.

When the abovementioned process is repeated to the end, it is determined in step S94 that there is no next SSD 122 (step S94: No), and the backup process shown in FIG. 26 ends. Thus, in a case where the number of the SSDs 122 is more than one, data to be backed up can be backed up.

Next, a backup process when part of data in the RAID system 111 is updated will be described. For example, it is assumed that the same process as the SSD update process in FIG. 11 is executed with respect to the respective SSDs 122, and thereby, data indicated by logical addresses "0x000" and "0x002" are updated as shown by a map table 141a' in FIG. 19. To be specific, it is assumed that, as shown by data storage information 142a' in FIG. 20, physical address "0x101" associated with logical address "0x000" is updated to "0x201," data "AAA" is updated to "AAA+," and erase count "1" is updated to "2." Likewise, it is assumed that physical address "0x103" associated with logical address "0x002" is updated to "0x202," data "CCC" is updated to "CCC+," and erase count "1" is updated to "2."

Figure 19:
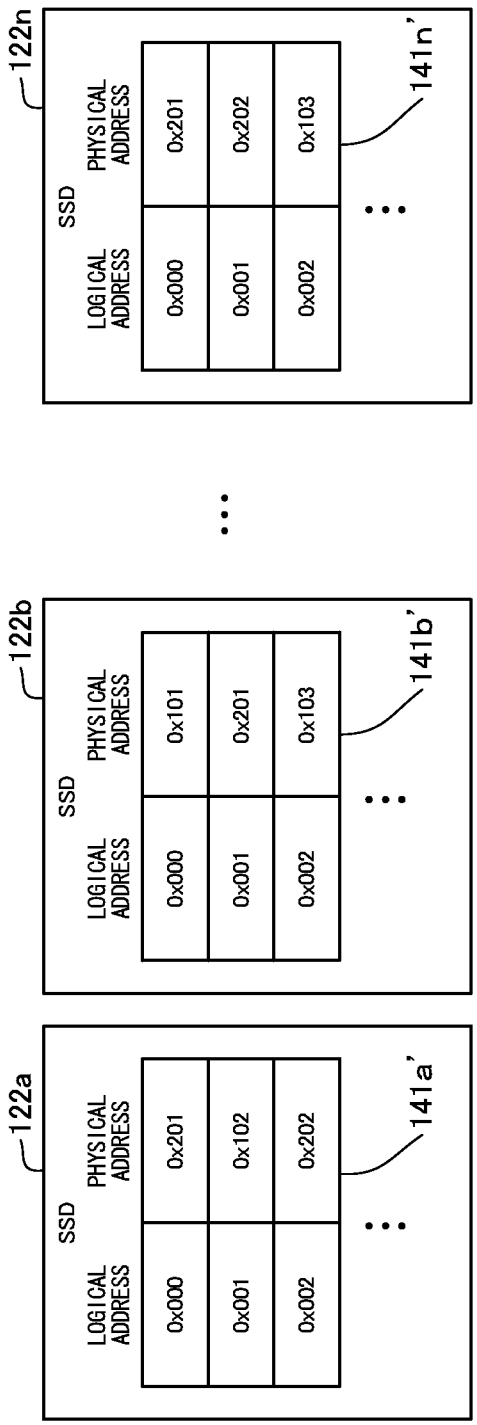
FIG. 19 is a diagram showing an example of the map table.
Figure 21:
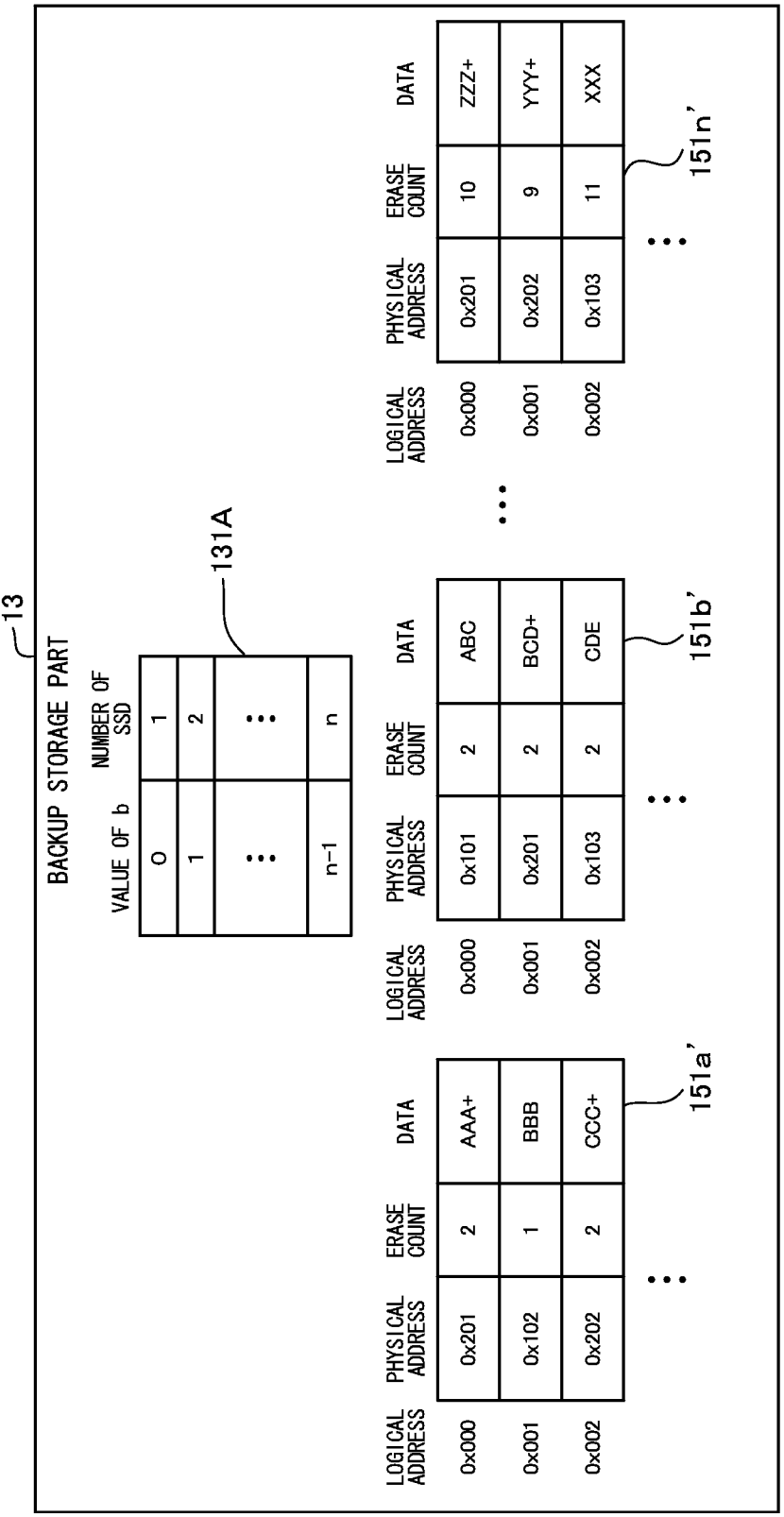
FIG. 21 is a diagram showing an example of the backup information.

Further, it is assumed that, as shown by a map table 141b' in FIG. 19, data indicated by logical address 0x001" is updated likewise. To be specific, as shown by data storage information 142b' in FIG. 20, physical address "0x102" associated with logical address "0x001" is updated to "0x201," data "BCD" is updated to "BCD+," and erase count "2" is updated to "3."

Furthermore, it is assumed that, as shown by a map table 141n' in FIG. 19, data indicated by logical address 0x000" is updated likewise. To be specific, as shown by data storage information 142n' in FIG. 20, physical address "0x101" associated with logical address "0x000" is updated to "0x201," data "ZZZ" is updated to "ZZZ+," and erase count "9" is updated to "10." Likewise, it is assumed that, as shown by the map table 141n' in FIG. 19, data indicated by logical address 0x001" is updated. To be specific, as shown by the data storage information 142n' in FIG. 20, physical address "0x102" associated with logical address "0x001" is updated to "0x202," data "YYY" is updated to "YYY+," and erase count "9" is updated to "10."

An operation when the backup process is executed again after the SSDs 122 are updated as mentioned above will be described below. Because steps S81 to S83 are the same as described above, a description thereof will be omitted. First, the acquiring part 21 acquires a logical address (e.g., logical address "0x000" of the SSD 122a) for identifying data to be backed up (step S84) and, referring to the map table 141a' shown in FIG. 19 and the data storage information 142a' shown in FIG. 20, acquires a physical address (e.g., physical address "0x201") and an erase count (e.g., erase count "2") that are associated with the acquired logical address (steps S85 and S86).

Next, the deciding part 22 refers to the backup storage part 13, and determines whether there is a backup or not (step S87). For example, because information associated with the logical address "0x000" is stored in the backup information 151a shown in FIG. 18, the deciding part 22 determines that there is a backup (step S87: Yes).

Subsequently, the acquiring part 21 acquires a physical address and an erase count from the backup storage part 13 (step S88). For example, the acquiring part 21 acquires physical address "0x101" and erase count "1" that are associated with logical address "0x000" acquired in step S84 from the backup information. Then, the deciding part 22 determines whether the physical addresses and the erase counts match or not, respectively (step S89). For example, the deciding part 22 compares physical address "0x201" acquired in step S85 with physical address "0x101" acquired in step S88. Likewise, the deciding part 22 compares erase count "1" acquired in step S86 with erase count "2" acquired in step S88. Herein, the deciding part 22 determines that neither the physical addresses nor the erase counts match (step S89: No), and the process proceeds to step S90. Also in the case of determining that either the physical addresses or the erase counts do not match, the deciding part 22 determines No in step S89, and the process proceeds to step S90. Thus, the deciding part 22 decides a backup target based on the physical addresses and the erase counts stored on the SSD 122 and the physical addresses and the erase counts stored in the backup storage part 13.

Then, in step S90, the acquiring part 21 acquires data (data to be backed up) from the SSD 122 (step S90). For example, the acquiring part 21 refers to the data storage information 142a' shown in FIG. 20, and acquires data "AAA+" associated with physical address "0x201" acquired in step S85. Subsequently, the backup storage controlling part 24 stores the physical address, the erase count and the data that are to be backed up, into the backup storage part 13 (step S91). For example, the backup storage controlling part 24 stores physical address "0x201," erase count "2" and data "AAA+" acquired in steps S85, S86 and S90, respectively, in association with logical address "0x000" acquired in step S84 (e.g., line 1 of backup information 151a' shown in FIG. 21).

Next, the deciding part 22 determines whether there is a next backup target or not (step S92). For example, because logical address "0x001" is stored in a second data block in the map table 141a' shown in FIG. 19, the deciding part 22 determines that there is a next backup target (step S92: Yes). The acquiring part 21 acquires a next logical address (e.g., logical address "0x001") (step S93).

After logical address "0x001" is acquired, the process returns to step S85, and steps S85 and later are repeated. For example, the acquiring part 21 acquires physical address "0x102" and erase count "1" associated with logical address "0x001" (steps S85 and S86). Next, the deciding part 22 refers to the backup information 151a shown in FIG. 18, thereby determining whether there is a backup associated with logical address "0x001" (step S87), and determining that there is a backup (step S87: Yes).

Subsequently, the acquiring part 21 acquires physical address "0x102" and erase count "1" that are associated with logical address "0x001" from the backup storage part 13. The deciding part 22 compares physical address "0x102" acquired in step S85 with physical address "0x102" acquired in step S88, and also compares erase count "1" acquired in step S86 with erase count "1" acquired in step S88. Herein, the deciding part 22 determines that both the physical addresses and the erase counts match, respectively (step S89: Yes), and the process proceeds to step S92. Then, steps S92 and later are repeated as described above.

Consequently, all of the backup targets stored in the map table 141a' shown in FIG. 19 are stored into the backup storage part 13 in order of logical address "0x002," ... (e.g., see the backup information 151a' shown in FIG. 21). On the other hand, in the case of determining in step S92 that there is no backup target (step S92: No), the deciding part 22 refers to the list of the SSDs 122 acquired in step S81, and determines whether there is a next SSD 122 or not (step S94). In a case that there is a next backup target, the acquiring part 21 acquires the next SSD 122 (step S95). For example, the acquiring part 21 acquires the SSD 122b as the next SSD 122. After step S95, the process returns to step S84, and steps in step S84 or later are repeated.

When the abovementioned process is repeated to the end, it is determined in step S94 that there is no next SSD 122 (step S94: No), and the backup process shown in FIG. 26 ends. Thus, because backup is performed by deciding data to be backed up based on the physical addresses and the erase counts stored on the SSDs 122 (SSD update information) and the physical addresses and the erase counts stored in the backup storage part 13 (copy update information), it is not necessary to separately generate or store management information or the like, and it is possible to decrease load at the time of backup Next, a restoration process will be described by referring to FIGS. 27 and 28. This restoration process will be described by using a case of restoring the map tables 141a', 141b', ..., 141n' in FIG. 19 stored on the SSD and the data storage information 142a', 142b', ..., 142n' in FIG. 20 based on the backup information 151a, 151b, ..., 151n in FIG. 18. The restoration process shown in FIG. 27 starts, for example, when restoration to the SSD 12 is requested or at predetermined timing (e.g., regularly).

First, the acquiring part 21 acquires a list of the SSDs 122 from the RAID controlling part 121 (step S111). For example, the acquiring part 21 acquires "SSD 122a, SSD 122b, ..., SSD 122n" as the list of the SSDs 122. Subsequently, the acquiring part 21 acquires an SSD specification table 131 (e.g., the SSD specification table 131A shown in FIG. 15) from the RAID controlling part 121 (step S112). Further, the acquiring part 21 acquires an SSD specification table 131 (e.g., the SSD specification table 131A shown in FIG. 18) stored in the backup storage part 13 (step S113).

Then, the deciding part 22 marks an SSD 122 that information in the SSD specification tables 131 do not match (step S114). To be specific, the deciding part 22 compares the SSD specification table 131A in FIG. 15 acquired in step S112 with the SSD specification table 131A in FIG. 18 acquired in step S113, and detects and stores (marks) information that do not match. In this case, the SSD specification table 131A in FIG. 15 matches the SSD specification table 131A in FIG. 18, and therefore, there is no SSD 122 to be marked.

Next, the acquiring part 21 acquires erase counts from the respective SSDs 122 (step S115). For example, the acquiring part 21 acquires erase counts from the data storage information 142a, 142b', ..., 142n' in FIG. 20, and also acquires erase counts from the backup information 151a, 151b, ..., 151n in FIG. 18.

Subsequently, the deciding part 22 calculates average erase counts of the respective SSDs 122 based on the erase counts acquired in step S115 (step S116). For example, the deciding part 22 obtains "1.4, 2.25, ..., 10.0" as average erase counts of the respective SSDs 122a, 122b, ..., 122n. Likewise, the deciding part 22 obtains "1.0, 2.0, ..., 9.9" of the SSDs 122a, 122b, ..., 122n based on the respective backup information 151a, 151b, ..., 151n.

Then, the deciding part 22 decides a combination of SSDs to be replaced based on the average erase counts calculated in step S116 (step S117). To be specific, the deciding part 22 compares the average erase counts "1.4, 2.25, ..., 10.0" based on the erase counts stored on the SSDs 122 with the average erase counts "1.0, 2.0, ..., 9.9" based on the erase counts stored in the backup storage part 13, and decides a combination of SSDs 122 between which a difference of the average erase counts is more than a preset threshold (e.g., 5) as a replacement target, in decreasing order of the difference.

For example, because a difference between average erase count "10.0" of the SSD 122n and average erase count "1.0" of the SSD 122a stored in the backup storage part 13 is the largest and is more than threshold "5," the deciding part 22 decides a combination of the SSD 122a and the SSD 122n as a replacement target.

Next, the SSD storage controlling part 23 updates the SSD specification table based on the replacement target decided in step S117 (step S118). For example, the SSD storage controlling part 23 updates to an SSD specification table 131B in which the SSD numbers "1" and "n" are replaced as shown in FIG. 22.

Subsequently, in step S121 in FIG. 28, the acquiring part 21 acquires a logical address (step S121). For example, the acquiring part 21 refers to the backup information 151n in FIG. 18 based on the SSD specification table 131B in FIG. 22 (because of replacement of the SSD numbers), and acquires logical address "0x000" indicating a first data block. The deciding part 22 determines whether a restoration target is an SSD 122 to be replaced or an SSD 122 marked in step S114 (step S122). Herein, because the backup information 151n is to be restored, the deciding part 22 determines that the SSD 122n is a replacement target (step S122: Yes). In this case, steps S123 to S126 are omitted, and the process proceeds to step S127. Steps S123 to S126 will be described later.

In step S127, the information processing device 101 executes the SSD update process shown in FIG. 11 (step S127). In the SSD update process in step S127, first, the acquiring part 21 acquires update data from the backup storage part 13 (step S21). For example, the acquiring part 21 refers to the backup information 151n in FIG. 18, and acquires data "ZZZ" associated with logical address "0x000" acquired in step S121, as update data.

Next, the acquiring part 21 acquires a physical address with the smallest erase count from the SSD 122 (step S22). Herein, because the SSD 122n and the SSD 122a are replaced, the acquiring part 21 refers to the data storage information 142a' of the SSD 122a in FIG. 20, thereby detecting a smallest value of an erase count and acquiring a physical address associated with an erase count of the detected value. For example, the acquiring part 21 acquires physical address "0x301" with the smallest erase count. Subsequently, the SSD storage controlling part 23 stores the update data acquired in step S21 (step S23). For example, the SSD storage controlling part 23 stores update data "ZZZ" acquired in step S21 (backup data of the SSD 122n) into a storage region indicated by physical address "0x301" acquired in step S22 (a storage region of the SSD 122a). Further, the SSD storage controlling part 23 increments the erase count by 1 (step S24), and stores erase count "2" (e.g., see data storage information 142a" in FIG. 24).

Next, the acquiring part 21 acquires a logical address of the update target (step S25). Herein, the acquiring part 21 acquires logical address "0x000" acquired in step S121 (or step S129 to be described later) in FIG. 28. Because the logical address of the update target is acquired in step S121 (S129), step S25 may be omitted in the restoration process. Then, the SSD storage controlling part 23 stores the logical address acquired in step S25 (S121, S129) and the physical address acquired in step S22 so as to be associated with each other (step S26). For example, the SSD storage controlling part 23 stores logical address "0x000" and physical address "0x301" into the map table 141 so as to be associated with each other (e.g., see line 1 of a map table 141a" in FIG. 23). After step S26, the SSD update process shown in FIG. 11 ends, and the process proceeds to step S128 in FIG. 28.

Next, the deciding part 22 determines whether there is a next restoration target or not (step S128). For example, the deciding part 22 refers to the backup information 151n in FIG. 18, and determines whether predetermined information (e.g., a physical address or the like) is stored in a second data block or not. In the example shown in FIG. 18, because predetermined information is stored in the second data block, the deciding part 22 determines that there is a next restoration target (step S128: Yes). Then, the acquiring part 21 acquires a next logical address (step S129). For example, the acquiring part 21 acquires logical address "0x102" indicating the second data block, as the next logical address. After step S129, the process returns to step S123, and steps S123 and later are repeated.

As a result, based on the backup information 151n of the SSD 122n, data of the SSD 122a is restored (e.g., see the data storage information 142a" in FIG. 24). Because restoration is performed by replacing data of an SSD 122 that the number of updates (an erase count) is large with data of an SSD 122 that the number of updates is small in the above manner, it is possible to make the numbers of updates almost equal in the whole RAID system 111, and it is possible to extend the life of the whole RAID system 111 including the plurality of SSDs 122.

On the other hand, in the case of determining in step S128 that there is no next restoration target (step S128: No), the deciding part 22 refers to the list of the SSDs 122 acquired in step S111 in FIG. 27 and the SSD specification table 131 acquired in step S112 (e.g., the SSD specification table 131B in FIG. 22), thereby determining whether there is a next SSD 122 or not (step S130). In the list of the SSDs 122 acquired in step S111, information (an SSD number) indicating the SSD 122b is stored in the second data block of the SSD specification table 131B, so that the deciding part 22 determines that there is a next backup target (step S130: Yes). Then, the acquiring part 21 acquires a next SSD 122 (step S131). For example, the acquiring part 21 acquires the SSD 122b as the next SSD 122. After step S131, the process returns to step S121, and steps S121 and later are repeated.

For example, the acquiring part 21 refers to the backup information 151b in FIG. 18, and acquires logical address "0x000" indicating a first data block (step S121). Then, the deciding part 22 determines whether a restoration target is the SSD 122 to be replaced or the SSD 122 marked in step S114 (step S122). Herein, because the restoration target is the backup information 151b, the deciding part 22 determines that the SSD 122b is not a replacement target and is not marked (step S122: No), and the process proceeds to step S123.

In step S123, the acquiring part 21 acquires a physical address and an erase count from the backup storage part 13 (step S123). For example, the acquiring part 21 acquires physical address "0x101" and erase count "2" that are associated with logical address "0x000" acquired in step S121, from the backup information 151b in FIG. 18.

Next, the acquiring part 21 acquires a physical address from the SSD 122 (step S124). For example, the acquiring part 21 refers to the map table 141b' in FIG. 19, and acquires physical address "0x101" associated with logical address "0x000" acquired in step S121. Further, the acquiring part 21 acquires an erase count from the SSD 122 (step S125). For example, the acquiring part 21 refers to the data storage information 142b' in FIG. 20, and acquires an erase count associated with physical address "0x101" acquired in step S124.

Then, the deciding part 22 determines whether the physical addresses and the erase counts match or not, respectively (step S126). For example, the deciding part 22 compares physical address "0x101" acquired in step S123 with physical address "0x101" acquired in step S124, and also compares erase count "2" acquired in step S123 with erase count "2" acquired in step S125. Herein, the deciding part 22 determines that both the physical addresses and the erase counts match, respectively (step S126: Yes), the SSD update process in step S127 is omitted, and the process proceeds to step S128. Then, steps S128 and later are repeated as mentioned above.

For example, the acquiring part 21 refers to the backup information 151b in FIG. 18, and acquires logical address "0x001" indicating a next data block (step S129). Then, the deciding part 22 determines whether a restoration target is the SSD 122 to be replaced or the SSD 122 marked in step S114 (step S122). Herein, because the restoration target is the backup information 151b, the deciding part 22 determines that the SSD 122b is not the replacement target and is not marked (step S122: No), and the process proceeds to step S123. In a case where the deciding part 22 determines No in step S122 once, step S122 may be omitted when the process is executed with respect to the same SSD 122.

Next, the acquiring part 21 acquires a physical address and an erase count from the backup storage part 13 (step S123). For example, the acquiring part 21 acquires physical address "0x102" and erase count "2" that are associated with logical address "0x001" acquired in step S129 from the backup information 151b.

Next, the acquiring part 21 acquires a physical address from the SSD 122 (step S124). For example, the acquiring part 21 refers to the map table 141b' in FIG. 19, and acquires physical address "0x201" associated with logical address "0x001" acquired in step S121. Further, the acquiring part 21 acquires an erase count from the SSD 122 (step S125). For example, the acquiring part 21 refers to the data storage information 142b' in FIG. 20, and acquires erase count "3" associated with physical address "0x201" acquired in step S124.

Then, the deciding part 22 determines whether the physical addresses and the erase counts match or not, respectively (step S126). For example, the deciding part 22 compares physical address "0x102" acquired in step S123 with physical address "0x201" acquired in step S124. Likewise, the deciding part 22 compares erase count "2" acquired in step S123 with erase count "3" acquired in step S125. Herein, the deciding part 22 determines that neither the physical addresses nor the erase counts match (step S126: No), and the process proceeds to step S127. In the case of determining that either the physical addresses or the erase counts do not match, the deciding part 22 determines No in step S126, and the process proceeds to step S127. Thus, the deciding part 22 decides a restoration target based on the physical addresses and the erase counts stored on the SSDs 122 and the physical addresses and the erase counts stored in the backup storage part 13.

Subsequently, in step S127, the information processing device 101 executes the SSD update process shown in FIG. 11 (step S127). Herein, first, the acquiring part 21 acquires update data from the backup storage part 13 (step S21). For example, the acquiring part 21 refers to the backup information 151b in FIG. 18, and acquires data "BCD" associated with physical address "0x102" acquired in step S123 in FIG. 18, as the update data.

Next, the acquiring part 21 acquires a physical address with the smallest erase count from the SSDs 122 (step S22). For example, the acquiring part 21 acquires physical address "0x301" with the smallest erase count. Subsequently, the SSD storage controlling part 23 stores the update data acquired in step S21 (step S23). For example, the SSD storage controlling part 23 stores data "BCD" acquired in step S21 into a storage region indicated by physical address "0x301" acquired in step S22. Further, the SSD storage controlling part 23 stores erase count "3" obtained by incrementing the erase count by 1 (step S24), in association with physical address "0x301" (e.g., the data storage information 142b" in FIG. 24).

Next, the acquiring part 21 acquires a logical address of the update target (step S25). Herein, in step S129 in FIG. 28, the acquiring part 21 acquires logical address "0x001" acquired by referring to the backup information 151b in FIG. 18. Then, the SSD storage controlling part 23 stores the logical address acquired in step S25 (S129) and the physical address acquired in step S22 in association with each other (step S26). For example, the SSD storage controlling part 23 stores logical address "0x001" and physical address "0x301" in association with each other into the map table 141 (e.g., see line 2 of a map table 141b" in FIG. 23). After step S26, the SSD update process shown in FIG. 11 ends, and the process proceeds to step S128 in FIG. 28. Then, steps 128 and later are repeated in the same manner.

Figure 23:
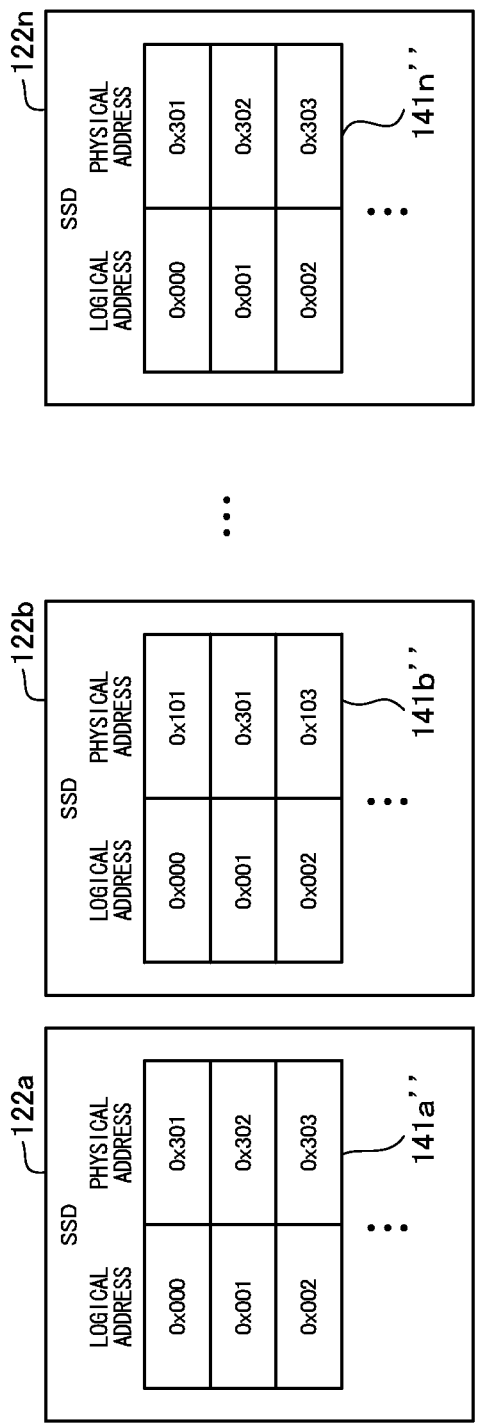
FIG. 23 is a diagram showing an example of the map table.

Consequently, based on the backup information 151 shown in FIG. 18, all of the restoration targets are stored on the SSDs 122 (e.g., see FIGS. 23 and 24). Because restoration of data is thus performed by deciding data to be restored based on the physical addresses and the erase counts stored on the SSDs 122 and the physical addresses and the erase counts stored in the backup storage part 13, it is not necessary to separately generate or store management information or the like, and it is possible to decrease load at the time of restoration, as in the backup process.

Third Exemplary Embodiment

Figure 29:
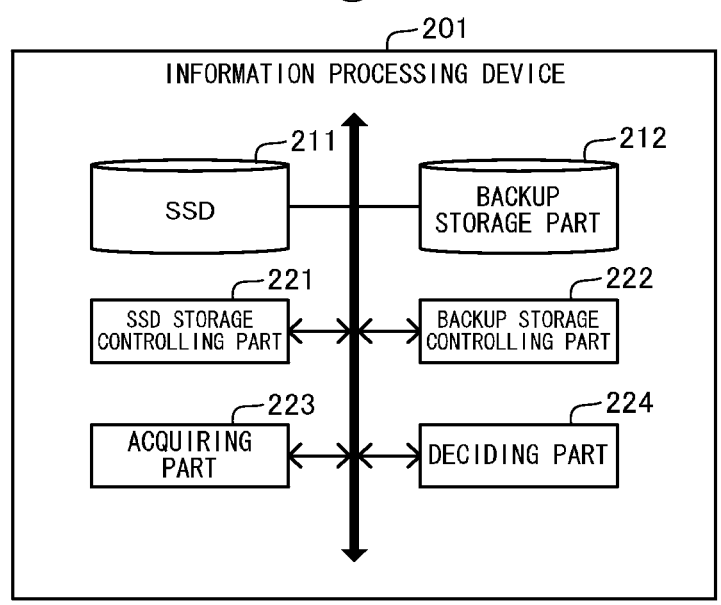
FIG. 29 is a block diagram showing the outline of the configuration of an information processing device according to a third exemplary embodiment of the present invention.

Next, an information processing system according to a third exemplary embodiment of the present invention will be described by referring to FIG. 29.

An information processing system 201 according to the third exemplary embodiment includes:

an SSD storage controlling part 221 (an SSD storage controlling means) for storing predetermined data into an SSD (Solid State Drive) 211, and also storing SSD update information in association with data identification information into the SSD 211, the SSD update information including a physical address of a storage region storing the stored data and a number of updates of the storage region, and the data identification information being for identifying the data;

a backup storage controlling part 222 (a backup storage controlling means) for storing copy data of the data stored in the SSD 211, copy update information obtained by copying the SSD update information, and the data identification information, in association with each other into a backup storage part 212;

an acquiring part 223 (an acquiring means) for acquiring the SSD update information from the SSD 211, and also acquiring the copy update information associated with the same data identification information as the data identification information associated with the acquired SSD update information, from the backup storage part 212; and a deciding part 224 (a deciding means) for deciding the data to be stored into the backup storage part 212 based on the SSD update information and the copy update information acquired by the acquiring part 223.

With the above configuration, the SSD storage controlling part 221 stores predetermined data, and a physical address of a storage region storing the data and a number of updates of the storage region (SSD update information), in association with data identification information into the SSD 211. Further, the backup storage controlling part 222 stores copy data of the data stored in the SSD 211, copy update information obtained by copying the SSD update information, and the data identification information, in association with each other into the backup storage part 212. Then, the acquiring part 223 acquires the SSD update information and the copy update information associated with the same data identification information, and the deciding part 224 decides the data to be stored into the backup storage part 212 based on the acquired SSD update information and the acquired copy update information. Because data to be backed up is thus decided based on the SSD update information stored in the SSD 211 and the copy update information stored in the backup storage part 212, it is not necessary to separately generate or store management information or the like, and it is possible to reduce load at the time of backup using the SSD 211.

Although the present invention is described above by referring to the exemplary embodiments, the present invention is not limited to the exemplary embodiments. The configurations and details of the present invention can be modified in various manners that can be understood by one skilled in the art within the scope of the present invention.

<Supplementary Notes>

The whole or part of the exemplary embodiments disclosed above can be described as the following supplementary notes. The configurations of an information processing device, and so on, according to the present invention will be schematically described below. However, the present invention will not be limited to the following configurations.

(Supplementary Note 1)

An information processing device comprising:

an SSD storage controlling unit for storing predetermined data into an SSD (Solid State Drive), and also storing SSD update information in association with data identification information into the SSD, the SSD update information including a physical address of a storage region storing the stored data and a number of updates of the storage region, and the data identification information being for identifying the data;

a backup storage controlling unit for storing copy data of the data stored in the SSD, copy update information obtained by copying the SSD update information, and the data identification information, in association with each other into a backup storage part;

an acquiring unit for acquiring the SSD update information from the SSD, and also acquiring the copy update information associated with the same data identification information as the data identification information associated with the acquired SSD update information, from the backup storage part; and a deciding unit for deciding the data to be stored into the backup storage part based on the SSD update information and the copy update information acquired by the acquiring unit.

With the above configuration, the SSD storage controlling unit stores predetermined data, and a physical address of a storage region storing the data and a number of updates of the storage region (SSD update information), in association with data identification information into the SSD. Further, the backup storage controlling unit stores copy data of the data stored in the SSD, copy update information obtained by copying the SSD update information, and the data identification information, in association with each other. Then, the acquiring unit acquires the SSD update information and the copy update information associated with the same data identification information, and the deciding unit decides the data to be stored into the backup storage part based on the acquired SSD update information and the acquired copy update information. Because data to be backed up is thus decided based on the SSD update information stored in the SSD and the copy update information stored in the backup storage part, it is not necessary to separately generate or store management information or the like, and it is possible to reduce load at the time of backup using the SSD.

(Supplementary Note 2)

The information processing device according to Supplementary Note 1, wherein the deciding unit is configured to determine whether the SSD update information and the copy update information acquired by the acquiring unit match or not and, when determining that the SSD update information does not match the copy update information, decide the data associated with the SSD update information as the data to be stored into the backup storage part.

With the above configuration, when the SSD update information does not match the copy update information, the deciding unit decides the data associated with the SSD update information as the data to be stored into the backup storage part. As a result, it is not necessary to separately generate or store management information or the like, and it is possible to decide data to be backed up with a simple configuration.

(Supplementary Note 3)

The information processing device according to Supplementary Note 2, wherein the deciding unit is configured to determine whether the physical address included in the SSD update information matches the physical address included in the copy update information or not, also determine whether the number of updates included in the SSD update information matches the number of updates included in the copy update information or not and, when at least either the physical addresses or the numbers of updates do not match as a result of the determination, decide the data associated with the SSD update information as the data to be stored into the backup storage part.

With the above configuration, the deciding unit determines whether the physical addresses included in the SSD update information and the copy update information, respectively, match or not and whether the numbers of updates included in the SSD update information and the copy update information, respectively, match or not and, when at least either the physical addresses or the numbers of updates do not match as a result of the determination, decides the data associated with the SSD update information as the data to be stored into the backup storage part. As a result, it is not necessary to separately generate or store management information or the like, and it is possible to securely decide data to be backed up with a simple configuration.

(Supplementary Note 4)

The information processing device according to any of Supplementary Notes 1 to 3, wherein the SSD storage controlling unit is configured to, at a time of update of the data associated with the data identification information, detect a storage region in which the number of updates is smallest, store the data to be updated into the detected storage region, and also store new SSD update information in association with the data identification information, the new SSD update information including a physical address of the detected storage region and a number of updates obtained by adding 1 to the number of updates associated with the storage region.

With the above configuration, at a time of update of the data associated with the data identification information, the SSD storage controlling unit detects a storage region in which the number of updates is smallest, and stores the data to be updated into the detected storage region. Also, the SSD storage controlling unit stores a physical address of the detected storage region and a number of updates obtained by adding 1 to the number of updates, as new SSD update information in association with the data identification information. As a result, because update data are stored into storage regions in an almost evenly distributed manner, it is possible to extend the life of the SSD. Further, because new SSD update information is stored, it is possible to use the SSD update information again when deciding a backup target.

(Supplementary Note 5)

The information processing device according to any of Supplementary Notes 1 to 4, wherein:

the acquiring unit is configured to acquire the data to be stored into the backup storage part decided by the deciding unit, from the SSD; and the backup storage controlling unit is configured to store copy data of the data acquired by the acquiring unit, copy update information obtained by copying the SSD update information associated with the data, and the data identification information for identifying the acquired data, in association with each other into the backup storage part.

With the above configuration, the backup storage controlling unit stores copy data of the data decided by the deciding unit and acquired by the acquiring unit, and copy update information obtained by copying the SSD update information associated with the data. as a result, because new copy update information is stored in the backup storage part, it is possible to store copy update information used when the deciding unit decides data to be backed up, with a simple configuration.

(Supplementary Note 6)

The information processing device according to any of Supplementary Notes 1 to 5, wherein in a case where the information processing device is configured to control a plurality of SSDs as one storage device:

the backup storage controlling unit is configured to, in association with SSD specification information for specifying the SSD whose data and SSD update information are stored, store the copy data obtained by copying the data and the copy update information obtained by copying the SSD update information, into the backup storage part;

the acquiring unit is configured to acquire at least either the numbers of updates included in all of the SSD update information stored for each of the SSDs or the numbers of updates included in all of the copy update information stored for each of the SSDs in the backup storage part, as a number of updates of whole SSD for each of the SSDs; and the deciding unit is configured to decide the SSD to store the copy data based on the numbers of updates of whole SSD of the respective SSDs acquired by the acquiring unit.

With the above configuration, in a case where a plurality of SSDs are controlled as one storage device, the backup storage controlling unit, in association with SSD specification information for specifying the SSD whose data and SSD update information are stored, stores the copy data and the copy update information. Then, the acquiring unit acquires at least either the numbers of updates included in all of the SSD update information stored for each of the SSDs or the numbers of updates included in all of the copy update information stored for each of the SSDs in the backup storage part, as a number of updates of whole SSD for each of the SSDs. The deciding unit decides the copy data to be stored into the SSD based on the acquired numbers of updates of whole SSD of the respective SSDs. Because an SSD to store data to be restored is thus decided when there are a plurality of SSDs, it is possible to make the numbers of updates of the respective SSDs even, and extend the life of the SSDs as one storage device.

(Supplementary Note 7)

The information processing device according to Supplementary Note 6, wherein:

the deciding unit is configured to decide a combination of the SSDs to store the copy data so that, a number of updates of whole SSD of a specific SSD among the numbers of updates of whole SSD acquired by the acquiring unit becomes close to an average value of the acquired numbers of updates of whole SSD; and the SSD storage controlling unit is configured to store copy data associated with one of the SSDs decided by the deciding unit into the other SSD, and also store copy data associated with the other SSD into the one SSD.

With the above configuration, the deciding unit decides a combination of the SSDs to store the copy data so that, an acquired specific number of updates of whole SSD becomes close to an average value of the numbers of updates of whole SSD. Then, the SSD storage controlling unit stores copy data associated with one of the decided SSDs into the other SSD, and also store copy data associated with the other SSD into the one SSD. Because restoration of data is thus performed by replacing the detected SSDs, it is possible to control so that use frequencies of the respective SSDs become almost even. As a result, the lives of the SSDs are leveled and the SSDs can be exchanged at almost same timing, so that it is possible to reduce load of management of the SSDs.

(Supplementary Note 8)

A non-transitory computer-readable medium storing a program comprising instructions for causing an information processing device to realize:

an SSD storage controlling unit for storing predetermined data into an SSD (Solid State Drive), and also storing SSD update information in association with data identification information into the SSD, the SSD update information including a physical address of a storage region storing the stored data and a number of updates of the storage region, and the data identification information being for identifying the data;

a backup storage controlling unit for storing copy data of the data stored in the SSD, copy update information obtained by copying the SSD update information, and the data identification information, in association with each other into a backup storage part;

an acquiring unit for acquiring the SSD update information from the SSD, and also acquiring the copy update information associated with the same data identification information as the data identification information associated with the acquired SSD update information, from the backup storage part; and a deciding unit for deciding the data to be stored into the backup storage part based on the SSD update information and the copy update information acquired by the acquiring unit.

(Supplementary Note 9)

The non-transitory computer-readable medium storing the program according to Supplementary Note 8, wherein the deciding unit is configured to determine whether the SSD update information and the copy update information acquired by the acquiring unit match or not and, when determining that the SSD update information does not match the copy update information, decide the data associated with the SSD update information as the data to be stored into the backup storage part.

(Supplementary Note 10)

An information processing method comprising:

storing predetermined data into an SSD (Solid State Drive), and also storing SSD update information in association with data identification information into the SSD, the SSD update information including a physical address of a storage region storing the stored data and a number of updates of the storage region, and the data identification information being for identifying the data;

storing copy data of the data stored in the SSD, copy update information obtained by copying the SSD update information, and the data identification information, in association with each other into a backup storage part;

acquiring the SSD update information from the SSD, and also acquiring the copy update information associated with the same data identification information as the data identification information associated with the acquired SSD update information, from the backup storage part; and deciding the data to be stored into the backup storage part based on the acquired SSD update information and the acquired copy update information.

The invention claimed is:

1. An information processing device comprising:
an SSD storage controlling unit for storing predetermined data into an SSD (Solid State Drive), and also storing SSD update information in association with data identification information into the SSD, the SSD update information including a physical address of a storage region storing the stored data and a number of updates of the storage region, and the data identification information being for identifying the data;
a backup storage controlling unit for storing copy data of the data stored in the SSD, copy update information obtained by copying the SSD update information, and the data identification information, in association with each other into a backup storage part;
an acquiring unit for acquiring the SSD update information from the SSD, and also acquiring the copy update information associated with the same data identification information as the data identification information associated with the acquired SSD update information, from the backup storage part a deciding unit for deciding the data to be stored into the backup storage part based on the SSD update information and the copy update information acquired by the acquiring unit; wherein the deciding unit is configured to determine whether the SSD update information and the copy update information acquired by the acquiring unit match or not and, when determining that the SSD update information does not match the copy update information, decide the data associated with the SSD update information as the data to be stored into the backup storage part; wherein the deciding unit is configured to determine whether the physical address included in the SSD update information matches the physical address included in the copy update information or not, also determine whether the number of updates included in the SSD update information matches the number of updates included in the copy update information or not and, when at least either the physical addresses or the numbers of updates do not match as a result of the determination, decide the data associated with the SSD update information as the data to be stored into the backup storage part.

2. The information processing device according to claim 1, wherein the SSD storage controlling unit is configured to, at a time of update of the data associated with the data identification information, detect a storage region in which the number of updates is smallest, store the data to be updated into the detected storage region, and also store new SSD update information in association with the data identification information, the new SSD update information including a physical address of the detected storage region and a number of updates obtained by adding 1 to the number of updates associated with the storage region.

3. The information processing device according to claim 1, wherein:

the acquiring unit is configured to acquire the data to be stored into the backup storage part decided by the deciding unit, from the SSD; and the backup storage controlling unit is configured to store copy data of the data acquired by the acquiring unit, copy update information obtained by copying the SSD update information associated with the data, and the data identification information for identifying the acquired data, in association with each other into the backup storage part.

4. The information processing device according to claim 1, wherein in a case where the information processing device is configured to control a plurality of SSDs as one storage device:

the backup storage controlling unit is configured to, in association with SSD specification information for specifying the SSD whose data and SSD update information are stored, store the copy data obtained by copying the data and the copy update information obtained by copying the SSD update information, into the backup storage part;

the acquiring unit is configured to acquire at least either the numbers of updates included in all of the SSD update information stored for each of the SSDs or the numbers of updates included in all of the copy update information stored for each of the SSDs in the backup storage part, as a number of updates of whole SSD for each of the SSDs; and the deciding unit is configured to decide the SSD to store the copy data based on the numbers of updates of whole SSD of the respective SSDs acquired by the acquiring unit.

5. The information processing device according to claim 4, wherein:

the deciding unit is configured to decide a combination of the SSDs to store the copy data so that, a specific number of updates of whole SSD of a specific SSD among the numbers of updates of while SSD acquired by the acquiring unit becomes close to an average value of the acquired numbers of updates of whole SSD; and the SSD storage controlling unit is configured to store copy data associated with one of the SSDs decided by the deciding unit into the other SSD, and also store copy data associated with the other SSD into the one SSD.

6. A non-transitory computer-readable medium storing program comprising instructions for causing an information processing device to realize:

an SSD storage controlling unit for storing predetermined data into an SSD (Solit State Drive), and also storing SSD update information in association with data identification information into the SSD, the SSD update information including a physical address of a storage region storing the stored data and a number of updates of the storage region, and the data identification information being for identifying the data;

a backup storage controlling unit for storing copy data of the data stored in the the SSD, copy update information obtained by copying the SSD update information, and the data identification information, in association with each other into a backup storage part;

an acquiring unit for acquiring the SSD update information from the SSD, and also acquiring the copy update information associated with the same data identification information as the data identification information associated with the acquired SSD update information, from the backup storage part; and a deciding unit for deciding the data to be stored into the backup storage part based on the SSD update information and the copy update information acquired by the acquiring unit; wherein the deciding unit is configured to determine whether the SSD update information and the copy update information acquired by the acquiring unit match or not and, when determining that the SSD update information does not match the copy update information, decide the data associated with the SSD update information as the data to be stored into the backup storage part; wherein the deciding unit is configured to determine whether the physical address included in the SSD update information matches the physical address included in the copy update information or not, also determine whether the number of updates included in the SSD update information matches the number of updates included in the copy update information or not and, when at least either the physical addresses or the numbers of updates do not match as a result of the determination, decide the data associated with the SSD update information as the data to be stored into the backup storage part.

7. An information processing method comprising:

storing predetermined data into an SSD (Solid State Drive), and also storing SSD update information in association with data identification information into the SSD, the SSD update information including a physical address of a storage region storing the stored data and a number of updates of the storage region, and the data identification information being for identifying the data;

storing copy data of the data stored in the SSD, copy update information obtained by copying the SSD update information, and the data identification information, in association with each other into a backup storage part;

acquiring the SSD update information from the SSD, and also acquiring the copy update information associated with the same data identification information as the data identification information associated with the acquired SSD update information, from the backup storage part; and deciding the data to be stored into the backup storage part based on the acquired SSD update information and the acquired copy update information; wherein deciding the data to be stored into the backup storage part comprises determining whether the SSD update information and the copy update information acquired match or not and, when determining that the SSD update information does not match the copy update information, decide the data associated with the SSD update information as the data to be stored into the backup storage part; wherein deciding the data to be stored into the backup storage part further comprises determining whether the physical address included in the SSD update information matches the physical address included in the copy update information or not, also determine whether the number of updates included in the SSD update information matches the number of updates included in the copy update information or not and, when at least either the physical addresses or the numbers of updates do not match as a result of the determination, decide the data associated with the SSD update information as the data to be stored into the backup storage part.

* * * * *